United States Patent
Noack et al.

(10) Patent No.: US 12,274,980 B2
(45) Date of Patent: Apr. 15, 2025

(54) CATALYTIC SYSTEM AND METHOD FOR THE REMOVAL OF HCN FROM OFF-GASES OF A FLUID CRACKING UNIT USING SAME, AND FCC UNIT ASSEMBLY INCLUDING THE CATALYTIC SYSTEM

(71) Applicant: UMICORE AG & CO. KG, Hanau-Wolfgang (DE)

(72) Inventors: Hendrik-David Noack, Hanau (DE); David Taylor, Houston, TX (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 18/459,539

(22) Filed: Sep. 1, 2023

(65) Prior Publication Data

US 2024/0075427 A1 Mar. 7, 2024

Related U.S. Application Data

(60) Provisional application No. 63/404,001, filed on Sep. 6, 2022.

(30) Foreign Application Priority Data

Sep. 19, 2022 (KR) .......................... 1020220118212

(51) Int. Cl.
*B01D 53/86* (2006.01)
*B01D 53/58* (2006.01)
(Continued)

(52) U.S. Cl.
CPC ..... *B01D 53/8621* (2013.01); *B01D 53/8671* (2013.01); *B01J 23/22* (2013.01);
(Continued)

(58) Field of Classification Search
CPC ........ F01N 3/206; F01N 3/2066; F01N 3/208; F01N 11/007; F01N 2240/30;
(Continued)

(56) References Cited

U.S. PATENT DOCUMENTS

| 4,199,435 A | 4/1980 | Chessmore et al. |
| 4,290,878 A | 9/1981 | Blanton, Jr. |

(Continued)

FOREIGN PATENT DOCUMENTS

| CN | 101362051 A | 2/2009 |
| CN | 111450900 A | 7/2020 |

(Continued)

OTHER PUBLICATIONS

International Search Report dated Dec. 1, 2023 for International Patent Application No. PCT/EP2023/074407 (4 pages).

(Continued)

*Primary Examiner* — Binh Q Tran
(74) *Attorney, Agent, or Firm* — Smith, Gambrell & Russell, LLP

(57) ABSTRACT

Systems and methods directed at removing HCN from an FCC process flue gas (and/or generated in the catalyst system reactions themselves) such that the final HCN output is satisfactory; while, in so doing, avoiding undesirable levels of other pollutants contained in that exhaust gas such as NOx. A system includes an assembly having a fluid catalytic cracking (FCC) unit generating a flue gas with HCN and NOx and a catalyst device placed in the flue gas line to remove HCN and NOx. The catalyst device having one or more SCR catalytic articles, as in one free of platinum group metal material (PGM) or a dual functioning SCR catalyst with PGM, or a combination of each. The assembly can be provided with an ammonia supplier and optionally an (Continued)

H2O supplier with associated injection for supply into the flue gas upstream of a catalytic article(s).

25 Claims, 5 Drawing Sheets

(51) Int. Cl.
*B01D 53/94* (2006.01)
*B01J 23/22* (2006.01)
*F01N 3/08* (2006.01)
*F01N 3/20* (2006.01)
*F01N 11/00* (2006.01)

(52) U.S. Cl.
CPC .......... *F01N 3/2066* (2013.01); *F01N 11/007* (2013.01); *B01D 53/58* (2013.01); *B01D 53/8634* (2013.01); *B01D 53/9422* (2013.01); *B01D 53/9436* (2013.01); *B01D 2257/402* (2013.01); *B01D 2257/404* (2013.01); *B01D 2257/408* (2013.01); *B01D 2257/502* (2013.01); *B01D 2258/0283* (2013.01); *F01N 3/0885* (2013.01); *F01N 3/206* (2013.01); *F01N 3/208* (2013.01); *F01N 2240/30* (2013.01); *F01N 2250/08* (2013.01); *F01N 2370/02* (2013.01); *F01N 2560/022* (2013.01); *F01N 2570/04* (2013.01); *F01N 2570/10* (2013.01); *F01N 2570/145* (2013.01); *F01N 2570/18* (2013.01); *F01N 2570/22* (2013.01); *F01N 2590/10* (2013.01); *F01N 2610/01* (2013.01); *F01N 2610/02* (2013.01); *F01N 2610/10* (2013.01); *F01N 2610/12* (2013.01); *F01N 2610/1406* (2013.01); *F01N 2900/1821* (2013.01); *F01N 2900/1822* (2013.01)

(58) Field of Classification Search
CPC ........... F01N 2370/02; F01N 2560/022; F01N 2570/10; F01N 2570/145; F01N 2570/18; F01N 2570/22; F01N 2610/02; F01N 2610/1406; F01N 2900/1616; B01D 53/58; B01D 53/8621; B01D 53/8625; B01D 53/864; B01D 53/8634; B01D 53/8671; B01D 53/869; B01D 53/9422; B01D 53/9436; B01D 2257/402; B01D 2257/404; B01D 2257/408; B01D 2257/502; B01D 2257/708; B01D 2257/80; B01D 2258/0283; B01D 2251/2062; B01D 2255/102; B01D 2255/1021; B01D 2255/20707; B01D 2255/20723

See application file for complete search history.

(56) References Cited

U.S. PATENT DOCUMENTS

| | | | |
|---|---|---|---|
| 4,778,665 A | 10/1988 | Krishnamurthy et al. | |
| 5,173,278 A * | 12/1992 | Marler | C10G 11/182 423/236 |
| 5,720,785 A | 2/1998 | Baker | |
| 5,820,839 A | 10/1998 | Benderly et al. | |
| 5,830,346 A * | 11/1998 | Harandi | C10G 11/182 423/239.1 |
| 5,968,465 A | 10/1999 | Koveal et al. | |
| 6,667,011 B1 | 12/2003 | Munje et al. | |
| 7,431,904 B2 | 10/2008 | Høj et al. | |
| 7,497,942 B2 | 3/2009 | Xu | |
| 8,048,390 B2 | 11/2011 | Hammer et al. | |
| 8,323,600 B2 | 12/2012 | Thøgersen | |
| 8,652,426 B2 | 2/2014 | Hammer et al. | |
| 11,378,278 B2 | 7/2022 | Pedersen et al. | |
| 11,635,010 B1 | 4/2023 | Sharp et al. | |
| 2007/0129234 A1* | 6/2007 | Stockwell | B01J 35/19 502/34 |
| 2007/0140942 A1* | 6/2007 | Rosen | B01D 53/56 423/437.1 |
| 2007/0269352 A1 | 11/2007 | Miyauri et al. | |
| 2008/0213150 A1* | 9/2008 | Yaluris | B01J 35/19 423/239.2 |
| 2013/0104519 A1 | 5/2013 | Zhang et al. | |
| 2014/0041364 A1 | 2/2014 | Dandekar et al. | |
| 2014/0241969 A1* | 8/2014 | Evans | B01D 53/8628 423/236 |
| 2018/0056238 A1 | 3/2018 | Caruso et al. | |
| 2018/0111084 A1 | 4/2018 | Chen et al. | |
| 2020/0115301 A1* | 4/2020 | Roman | B01J 8/0035 |
| 2020/0129964 A1* | 4/2020 | Song | B01J 37/0045 |
| 2021/0180791 A1 | 6/2021 | Pedersen et al. | |

FOREIGN PATENT DOCUMENTS

| | | |
|---|---|---|
| DE | 19703711 C2 | 7/1999 |
| EP | 0 037 158 A1 | 10/1981 |
| EP | 1 866 085 A2 | 12/2007 |
| EP | 2 111 287 B1 | 3/2011 |
| EP | 2 522 423 B1 | 12/2020 |
| KR | 10-1475681 B1 | 12/2014 |
| WO | 2004/111160 A1 | 12/2004 |
| WO | 2006/104612 A2 | 10/2006 |
| WO | 2014/063738 A1 | 5/2014 |
| WO | 2014/124830 A1 | 8/2014 |
| WO | 2017/220473 A1 | 12/2017 |
| WO | 2021/115815 A1 | 6/2021 |

OTHER PUBLICATIONS

Written Opinion of the International Searching Authority dated Dec. 1, 2023 for International Patent Application No. PCT/EP2023/074407 (6 pages).

Bocos-Bintintan, Victor, et al. Fast Sensing of Hydrogen Cyanide (HCN) Vapors Using a Hand-Held Ion Mobility Spectrometer with Nonradioactive Ionization Source. MDPI. Sensors. 2021. vol 21, No. 5045, pp. 1-13.

Bakker, A., et al. An overview of HCN emissions from FCCU's and their potential impacts on human health. Concawe Environmental Science for European Refining Report 2019. No. 1/19. 45 pages.

Johar, Jasmeet Sing. Thesis: An Experimental Investigation of the Urea-Water Decomposition and Selective Catalytic Reduction (SCR) of Nitric Oxides With Urea Using $V_2O_5$-$WO_3$-$TiO_2$ Catalyst. 2005. Thesis submitted to the Office of Graduate Studies of Texas A&M University. 176 pages.

Li, Ming-Shi, et al. Influence of NO on the Reduction of $No_2$ with CO over $Pt/SiO_2$ in the Presence of $O_2$. Chinese Journal of Chemistry. 2007. vol. 25, pp. 435-438.

Resitoglu, Ibrahim Aslan et al. The pollutant emissions from diesel-engine vehicles and exhaust aftertreatment systems. Clean Techn Environ Policy. 2015.vol. 17. pp. 15-27.

Zengel, Deniz et al., Emission of Toxic HCN During NOx Removal by Ammonia SCR in the Lean-Burn Natural Gas Engines. Angew. Chem Int Ed. 2020. vol. 59, pp. 14423-14428.

Elsener, Martin et al. HCN Production form formaldehyde during the selective catalytic reduction of NOx with NH3 over $V2O_5$/$Wo_3$-$TiO_2$. Applied Catalysis B: Environmental. 2021. vol. 281, No. 119462, 8 pages.

\* cited by examiner

CATALYTIC SYSTEM AND METHOD FOR THE REMOVAL OF HCN FROM OFF-GASES OF A FLUID CRACKING UNIT USING SAME, AND FCC UNIT ASSEMBLY INCLUDING THE CATALYTIC SYSTEM

RELATED APPLICATIONS

This application claims priority to provisional U.S. application 63/404,001 filed Sep. 6, 2022, which application is incorporated herein in its entirety.

FIELD OF THE INVENTION

The invention relates to methods and systems for the removal of pollutants inclusive of hydrogen cyanide (HCN) from off-gases generated in a combustion unit as in a fluid catalytic cracking unit.

BACKGROUND OF THE INVENTION

The fluid catalytic cracking (FCC) unit is a major conversion unit present in many refineries throughout the world. FCC units are highly flexible and able to upgrade feeds comprising many components, ranging from light, sweet hydrotreated vacuum gas oil (VGO) to heavy, sour residues. In addition, FCC feed can include heavy streams from other refinery units, such as Coker gas oils, as well as low-value slops of ranging composition. Thus, in the FCC process, heavy hydrocarbon fractions are cracked to produce lighter, valuable products (e.g., gasoline, distillate, and C2-C4 olefins and saturated hydrocarbons).

A lot of attention has been paid to controlling NOx and SOx (and particulate) emissions from such FCC units. FCC unit design and additives have been geared to achieve the lowest levels of both SOx and NOx. More recently, however, hydrogen cyanide (HCN) emissions (which can be present in the flue gas of some FCC units at up to about 150 ppm) have come under scrutiny. That is, the FCC process is a known source of HCN gas emissions in petroleum refining. Such emissions can be problematic in that HCN is a highly toxic N-containing volatile organic compound (VOCs) that can pose a great threat to human living environment if not addressed. On the other hand, efforts to address HCN emission can lead to deviations in the other pollutants being generated by such combustion units. Furthermore, while at temperatures below 78° F., hydrogen cyanide is a colorless or pale-blue liquid (hydrocyanic acid); however, at higher temperatures, it is a colorless gas. Thus. HCN cyanide is very volatile and thus can mix well with air upon output from an FCC unit and thus it is imperative to ensure HCN levels do not rise to levels that are harmful to the environment and/or individuals.

Thus, there is an important need to address the potential of undesirable HCN levels reaching the atmosphere following FCC processing. However, the requirements for lowered emissions of other pollutants such as SOx, VOCs, CO, NOx must still be addressed to meet, for instance, regulatory requirements as to the pollutants released to atmosphere from combustion units.

The prior art, for example U.S. Pat. No. 11,378,278, describes, in the context of flue gas (herein the terms "flue gas" and "exhaust gas" are used synonymously) cleaning systems for modern power plants, systems that are equipped with an oxidation catalyst for the removal of volatile organic compounds (VOC) and carbon monoxide (CO), and furthermore with a reduction catalyst for the selective catalytic reduction (SCR) of nitrogen oxides ($NO_x$). Under such systems, removal of $NO_x$, VOC and CO is conventionally accomplished with the use of these two different catalyst compositions.

Selective catalytic reduction (SCR) is a catalytic reaction of nitrogen oxides, NO and $NO_2$, with typically involved ammonia as a reductant ($NH_3$—SCR) to form elemental nitrogen and water according to the reaction schemes below:

$$4NO+4NH_3+O_2 \rightarrow 4N_2+6H_2O \qquad (1)$$

$$NO+NO_2+2\ NH_3 \rightarrow 2N_2+3H_2O \qquad (2)$$

$$6NO_2+8NH_3 \rightarrow 7N_2+12H_2O \qquad (3)$$

$$2NO_2+4NH_3+O_2 \rightarrow 3N_2+6H_2O \qquad (4)$$

Reactions 1 and 2 are the predominant ones with one mole of ammonia consumed per each mole of $NO_x$ converted. Reactions 3 and 4 occur in gases where a large fraction of the $NO_x$ is present as $NO_2$. To allow the reactions to occur at temperatures of 150 to 480° C. (300 to 900° F.), a catalyst is used. The most common SCR catalyst type is based on vanadium pentoxide ($V_2O_5$) as the active compound on a titanium dioxide ($TiO_2$) carrier system.

Reaction 1 is known as the "standard SCR reaction", reaction 2 is the "fast SCR reaction", and reactions 3 and 4 are the "$NO_2$ SCR reaction".

The noted U.S. Pat. No. 11,378,278 further describes a system for the removal of volatile organic compounds, carbon monoxide and nitrogen oxides from off-gas, with an emphasis of achieving such removal even at high NO2 to NOx ratios, with the system comprising a source of ammonia, means for introducing ammonia into a catalytic article having an SCR functionality; a catalytic article having both an oxidation and an SCR functionality, the catalytic article comprising a catalyst substrate and a catalyst composition comprising at least one platinum group metal and/or at least one platinum group metal oxide, at least one oxide of titanium and at least one oxide of vanadium.

The prior art WO 2014/063738 A1 discloses a method for cleaning a sulphur dioxide containing off-gas by selective oxidation of carbon monoxide and volatile organic compounds in the off-gas with reduced formation of sulphur trioxide comprising the step of contacting the off-gas with an oxidation catalyst consisting of palladium and vanadium oxide supported on a carrier. If the off-gas additionally comprises nitrogen oxides, said off-gas is brought into contact with a catalyst being effective in the selective reduction of nitrogen oxides.

WO 2014/124830 A1 discloses a method and a catalyst where the flue gas or exhaust gas containing harmful carbon monoxide, organic volatile compounds and $NO_x$ is contacted with a layered catalyst in which a first layer comprises an oxidation catalyst and, in an underlying layer, an ammonia-SCR catalyst ($NH_3$—SCR catalyst) for the simultaneous removal of the carbon monoxide and $NO_x$.

WO 2017/220473 A1 discloses a method for the preparation of a monolithic catalyst for the reduction of nitrogen oxides, volatile organic compounds and carbon monoxides in an off-gas. The catalyst comprises at least one platinum group metal, vanadium oxide, titania and optionally tungsten oxide. The stated problem solved by this method is that it avoids the formation of platinum group metal concentration gradients over the whole axial and vertical length of the substrate. The formation of gradients is described as being particularly problematic if a substrate is preloaded with vanadium oxide and then impregnated with a platinum group metal.

US2014/0241969 describes a process for reducing the amount of HCN discharged to atmosphere from an FCC unit, having a regenerator and a means for collecting and supporting catalyst particles. The process comprises adding a catalyst to the regenerator flue gas prior to entering the collecting means and precipitating the catalyst in the collecting means to form a catalyst bed. Ammonia or ammonia precursor is optionally added to the flue gas. The flue gas HCN is reacted in the presence of water and oxygen in the flue gas, and optional ammonia or ammonia precursor, at 200° C. to 800° C. in the presence of the catalyst bed to reduce the HCN amount, and the flue gas containing a reduced amount of HCN is discharged eventually to atmosphere. The catalyst is noted as being one or more supported transition or lanthanide metal catalysts.

U.S. Pat. No. 5,173,278 describes denitrification of a flue gas that contains small amounts of both HCN and NOx, produced, for example, by catalyst regeneration in the fluid catalytic cracking of a petroleum gas oil, wherein flue gas is contacted under conversion conditions of elevated temperature with a catalyst that is active for the selective catalytic reduction of NOx by reaction with the HCN, said catalyst being selected from the group consisting of supported transition metals and crystalline zeolites, said contacting being conducted in the temperature range for converting said unwanted HCN and at least a fraction of the NOx by the reaction between the HCN and the NOx to a mixture comprising nitrogen gas, and discharging the denitrified flue gas to the atmosphere. There is also described in this patent a presumed reaction of HCN and NOx which is set out as follows: $HCN+NO \rightarrow N_2$ (gas)$+CO+CO_2+H_2O$.

US2018/0111084 describes an integrated purification method for the industrial exhaust gas of cyanides, hydrocarbons and NOx, wherein the exhaust gas is an industrial exhaust gas containing multi-component pollutants. The method comprises the steps of: subjecting the exhaust gas containing pollutants such as cyanides, hydrocarbons and nitrogen oxides (NOx) to a gas-liquid separation device to separate the free fluid, then mixing with the air blown by the air blower, and preheating by the heating unit; then entering into the SCC reactor for the selective catalytic combustion reaction. The reference describes the conversion of three pollutants containing cyanides (R—CN), hydrocarbons (CxHy) and nitrogen oxides (NOx) simultaneously in the same reactor through installation of catalysts with different functions, without installing an individual selective catalytic reduction denitration reactor and additional ammonia.

The above described prior art describes a plurality of approaches to the addressing of multi-component pollutants in exhaust gas, some of which involve treatment of exhaust gas in an FCC unit prior to the exhaust gas exiting the fractionation or main distillation column and heading to the FCC unit stack. Under any of the above described approaches, care must be taken, when emphasizing the removal of one or more pollutants, to avoid the development of other issues relative to the passing of one or more other pollutants in the exhaust flow. For instance, in addition to HCN being present in the FCC process exhaust, there is also the potential for HCN generation in an NH3-SCR system as a byproduct of such a reaction depending upon temperature and other exhaust flow and system characteristics. A discussion as to this HCN generation potential can be found, for instance, in *Angew. Chem Int Ed* 2020, 59 14423-14428, Zengel et al., *Emission of Toxic HCN During NOx Removal by Ammonia SCR in the Lean-Burn Natural Gas Engines*; as well as *Applied Catalysis B: Environmental* 281 (2021) 119462, Elsener et al, *HCN production from formaldehyde during the selective catalytic reduction of NOx with NH3 over V2O5/WO3-TiO2*.

There is thus considered a need in the art to be able to efficiently remove HCN from an exhaust gas such as that generated in an FCC process (and/or generated in the catalyst system's reactions themselves) such that the final HCN output is satisfactory while avoiding undesirable levels of other pollutants (e.g., NH3, NOx, CO and various VOCs) that might be contained in that exhaust gas.

Still further, as HCN output can be difficult to detect, there is also a need in the art to be able to efficiently monitor HCN output.

SUMMARY OF THE INVENTION

The present invention is directed at addressing the above described needs in the art; inclusive of providing systems and methods directed at an effort to efficiently remove HCN from an exhaust gas, as in that generated in an FCC process (and/or generated in the catalyst system reactions themselves) such that the final HCN output is satisfactory; while, in so doing, avoiding undesirable levels of other pollutants contained in that exhaust gas. While the below described systems and methods are primarily directed at the removal of HCN (and preferably other pollutants) contained in off-gases leaving an FCC unit, features of the present invention can be used to address other combustion units having the potential for releasing HCN into the environment such as gas turbine combustion units.

Thus, disclosed herein is a system well suited for HCN removal from exhaust gases, as in the removal of HCN contained in the off-gases of a fluid catalytic cracking (FCC) unit.

While the catalytic systems of the present invention can be dedicated to HCN removal alone from such off-gases, the catalytic systems of the present invention are preferably used in conjunction with HCN and NOx removal together; and, more preferably, are used in conjunction with the combined removal of NOx, hydrocarbons and VOCs in general (with emphasis on HCN), and CO.

When dealing with HCN reduction relative to off-gas flow over a catalyst system comprising an SCR catalyst and/or a Dual Function catalyst (i.e., catalyst that can reduce NOx as well as oxidize CO and VOCs) there is considered two main pathways for the destruction of the HCN:

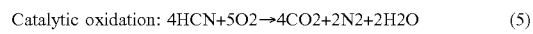

Catalytic oxidation: $4HCN+5O_2 \rightarrow 4CO_2+2N_2+2H_2O$ (5)

Hydrolysis: $HCN+H_2O \rightarrow NH_3+CO$ (6)

As noted above relative to U.S. Pat. No. 5,173,278, there is also speculated that there is an additional (denitrification) pathway of HCN breakdown considered to be as follows:

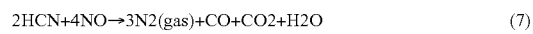

$2HCN+4NO \rightarrow 3N_2(gas)+CO+CO_2+H_2O$ (7)

Thus, disclosed herein is a system for the removal of HCN from FCC unit off-gas (as in a system that treats off-gas departing or travelling downstream from a fractionation or main distillation column); and preferably a system used in the removal of multiple pollutants simultaneously, such as volatile organic compounds (beyond an emphasis on HCN removal), carbon monoxide and nitrogen oxides from the FCC off-gas. The system preferably comprising a reductant source such as ammonia, means for introducing the reductant source (such as ammonia) into one or more catalytic articles having an SCR functionality; preferably inclusive of one or more catalytic articles having both an oxidation and an SCR functionality (or dual function catalyst "DFC"), the DFC catalytic article comprising a catalyst substrate and a catalyst composition preferably comprising the following: at least one platinum group metal and/or at least one platinum group metal oxide ("PGM"), at least one oxide of titanium and at least one oxide of vanadium, wherein the washcoat (or other means for providing the desired material) is supplied in and/or on the walls of the catalyst substrate (with the noted PGMs being represented by Pt, Pd, Rh, Ir, Ru and Os, with a subset of Pt, Pd and Rh being that which is preferred in the present environment, with the most preferred being one with Pd as the dominant PGM as in Pd alone, Pd and Pt, or Pd and Rh); preferably having as well means for measuring the amount of HCN (directly or indirectly as by the monitoring of an indicative level of another exhaust gas component) between the outlet end of the catalytic article and the stack or at the stack and preferably means for adjustments based on such monitoring.

Optionally, a non-dual functioning SCR catalytic article ("SCRart"), as in one that is free of PGM functioning as an oxidizing agent, can be used alone, or used in combination with a DFC; as in an SCRart placed upstream or downstream of a DFC, or in-between a pair of the DFC. Alternatively, a DFC can be used alone, or used in combination with an SCRart; as in an DFC placed upstream or downstream of an SCRart, or in-between a pair of the SCRart.

Also disclosed is a method for the removal of HCN (preferably in conjunction with the removal of one or more other pollutants such as other volatile organic compounds, nitrogen oxides, and carbon monoxide) from off-gases such as FCC generated off-gases. The method makes use of the system according to the invention and, in some method embodiments, preferably monitors HCN reduction performance, as through an analysis to determine the HCN travelling downstream of the system.

Aspects of the invention are inclusive of items 1 to 30 listed below inclusive of the various alternate combinations described therein.

1. An assembly, comprising:
   a fluid catalytic cracking (FCC) unit generating a flue gas with HCN and NOx;
   a catalytic system that comprises a catalyst device placed in line with the flue gas (as in at a location downstream of a fractionation column or main distillation column of the FCC unit) to remove HCN and NOx in the flue gas, the catalyst device having one or more catalytic articles, with one catalytic article of the one or more catalytic articles being an SCR catalytic article (SCRart) that is free of platinum group metal material (PGM) or an SCR catalytic article with PGM as to provide a dual function SCR catalytic article (DFC);
   a first source which includes ammonia or ammonia precursor;
   a second source that includes H2O; and
   an injection device for feeding one or each of the first and second sources to the flue gas upstream of at least one of the one or more catalytic articles.

2. The assembly of aspect 1, wherein the one or more catalytic articles of the catalyst device includes an SCRart.

3. The assembly of aspect 1 or 2, wherein the one or more catalytic articles of the catalyst device includes a DFC.

4. The assembly according to any one of aspects 1 to 3, wherein the one or more catalytic articles of the catalyst device includes each of a DFC and an SCRart.

5. The assembly according to any one of aspects 1 to 4, wherein the catalyst device includes at least three catalytic articles as to feature at least two DFC in combination with an SCRart or at least two SCRart in combination with a DFC.

6. The assembly of aspect 5, wherein the catalyst device comprises two DFC and one SCRart in an upstream to downstream sequence of DFC/SCRart/DFC or SCRart/DFC/DFC or DFC/DFC/SCRart.

7. The assembly of aspect 6, wherein the sequence is DFC/SCRart/DFC.

8. The assembly of aspects 6 or 7 wherein the upstream and downstream DFCs have different PGM loadings.

9. The assembly according to any one of aspects 1 to 5, wherein the catalyst device comprises two SCRart and one DFC in an upstream to downstream sequence of SCRart/SCRart/DFC or SCRart/DFC/SCRart or DFC/SCRart/SCRart.

10. The assembly of aspect 9, wherein the sequence is SCRart/SCRart/DFC.

11. The assembly according to any one of aspects 1 to 10, wherein the one of the one or more catalytic articles of the catalyst device comprises vanadium.

12. The assembly according to any one of aspects 1 to 11, further comprising means for determining an HCN level either directly or indirectly relative to HCN level passing downstream of the catalyst device.

13. The assembly of aspect 12, wherein the means for determining includes a sensor for a direct determination of an HCN level passing downstream of the catalyst device.

14. The assembly according to any one of aspects 1 to 13, further comprising a control unit, and means for determining an HCN level, which means for determining includes either a direct (preferably at location) determination, or an indirect determination (preferably at location) of the HCN level such as one that comprises a CO sensor which is in communication with the control unit for an extrapolation determination by the control unit of the HCN level amount.

15. The assembly according to any one of aspects 1 to 14, further comprising a container, and wherein the first and second sources are mutually stored in the container; and a first feed line extending from the container to the injection device for injection of each of the first and second sources together into the flue gas.

16. The assembly of aspect 15, wherein the first and second sources are urea and H2O mixed with the urea within the container, or aqueous ammonia within the container.

17. The assembly according to any one of aspects 1 to 16, further comprising a control unit and wherein the first and second sources feed to a distribution system comprising a valving system in communication with the first and second sources, and one or more feed lines of the distribution system communicate the first and second sources with the injection device for enabling feeding of one or both of the first and second sources to the injection device for injection into the flue gas passing toward the catalyst device, and wherein the control unit is in communication with sensing means monitoring one or more characteristics of the flue gas and with the valving system for adjustment of the relative percentage of the first and second sources reaching the flue gas.

18. The assembly of aspect 17 wherein the control unit is configured for adjusting the flow from the second source based on the sensed one or more characteristics of the flue gas as to provide for a variable range (e.g., from 0-15 vol %) of water vapor volume fraction in the flue gas traveling to the catalyst device based on a desired level of hydrolysis determined by the control unit. The "0" in the range of 0-15% is representative of the control unit providing for no added H2O (e.g., through valve control adjustments) relative to that which is being injected into the flue gas by the injecting device.

19. As a featured additional aspect (aspect 19) there is provided a catalyst device for use in the removal of flue gases generated in a fluid catalytic cracking unit, comprising at least three catalytic articles, with a first catalytic article of the at least three catalytic articles being an SCR catalytic article (SCRart) that is free of platinum group metal material (PGM) and a second of the at least three catalytic articles is an SCR catalyst with PGM as to provide a dual function SCR catalyst (DFC), with the at least three catalytic articles featuring at least two DFC in combination with an SCRart or at least two SCRart in combination with a DFC, in any order.

20. The catalyst device of aspect 19, wherein the catalyst device comprises at least two DFC in combination with an SCRart.

21. The catalyst device of aspect 19 or 20, wherein the upstream-to-downstream sequence of the catalytic articles is DFC/SCRart/DFC.

22. A further aspect of the present invention (aspect 22) is inclusive of a method for operating the assembly according to any one of aspects 1 to 18, comprising generating flue gas in the FCC unit and passing that flue gas to the catalyst device for removal of HCN and NOx.

23. The method of aspect 22, further comprising sensing as to determine or estimate the level of HCN downstream of the catalyst device.

24. An additional aspect of the present invention (aspect 24) involves a method for removing HCN from flue gas of an FCC unit; comprising passing the flue gas into contact with any one of the catalyst devices of aspects 19 to 21 (and optionally measuring for HCN levels downstream of the catalyst device).

25. A still further aspect of the present invention (aspect 25) involves a method of removing HCN from a flue gas flow comprising:

passing the flue gas to a catalytic system that comprises a catalyst device placed in line with the flue gas to remove HCN and NOx in the flue gas, the catalyst device having one or more catalytic articles, with one catalytic article of the one or more catalytic articles being an SCR catalytic article (SCRart) that is free of platinum group metal material (PGM) or an SCR catalytic article with PGM as to provide a dual function SCR catalytic article (DFC); and monitoring for HCN levels in the flue gas exiting the catalyst system.

26. The method of aspect 25 wherein the flue gas is generated by an FCC unit.

27. A still further aspect of the present invention (aspect 27) features an assembly, comprising:

a fluid catalytic cracking (FCC) unit generating a flue gas with HCN and NOx;

a control unit;

a catalyst device placed in line with the flue gas to remove HCN and NOx in the flue gas, wherein the catalyst device includes at least one dual function catalytic article (DFC) comprising a substrate that is a corrugated substrate supporting a catalyst composition that comprises, in addition to the PGM, such as palladium, oxides of vanadium and titanium, and preferably further comprising at least one or any combination of oxides of tungsten, oxides of molybdenum, and silica (preferably tungsten alone or tungsten and silica (in the latter case, mostly SiO2-doped TiO2 is used as the carrier)). As an example of a DFC there is featured 50 to 10,000 ppmw (parts per million per weight) of at least one platinum group metal calculated as the pure precious metal and based on the total weight of the catalytic article, wherein the platinum group metal is preferably palladium, and 60 to 90 wt.-% of at least one oxide of titanium, calculated as TiO2 and based on the total weight of the catalytic article, wherein the at least one oxide of titanium is titanium dioxide, and 0.1 to 17 wt.-% of at least one oxide of vanadium, calculated as V2O5 and based on the total weight of the catalytic article, wherein the at least one oxide of vanadium is preferably vanadium pentoxide, and wherein the total weight of the catalytic article is the sum of the amounts of the at least one platinum group metal, the amount of the at least one oxide of titanium, the amount of the at least one oxide of vanadium and the amount of the catalyst substrate (plus, if present, the amount of the above noted "at least one or any combination of oxides of tungsten, oxides of molybdenum, and silica"); and a sensor for monitoring directly or indirectly HCN levels in the flue gas exiting the catalyst device.

28. The assembly of aspect 27 further comprising a first source having material of ammonia or an ammonia precursor and a second source comprising H2O, and feeding means for feeding one of or both of the first source material and the second source material to the flue gas upstream of the catalyst device, and the control unit being configured to adjust the feeding means as to vary the amount of first and second sources being fed into the flue gas.

29. The assembly of aspect 27 or 28 further comprising a second SCR catalytic article (SCRart) in the catalyst device that is free of PGM.

30. The assembly of aspects 27, 28 or 29 wherein the catalyst device comprises at least three catalytic articles, with a first catalytic article of the at least three catalytic articles being an SCR catalytic article (SCRart) that is free of platinum group metal material (PGM), and a second of the at least three catalytic articles is the DFC, with the at least three catalytic articles featuring at least two DFC in combination with an SCRart or at least two SCRart in combination with a DFC.

The present systems and methods described herein for treating FCC flue gas are directed at an efficient removal of HCN as to avoid release of undesirable amounts of HCN; and, such removal is also preferably achieved under embodiments of the invention with a simultaneous removal of any one, or any sub-combination, or all, of typically associated pollutants in an FCC off-gas (such as the off-gas travelling downstream of a fractionation or main distillation column in the FCC unit) as in other hydrocarbon pollutants; NOx pollutants, carbon monoxide, and other pollutants that may be found in an FCC unit's generated off-gas.

The system and methods under the present invention for the removal of HCN (and preferably additional pollutants such as those classifiable as volatile organic compounds, carbon monoxide and nitrogen oxides) from combustion gases, such as FCC off-gas, are explained in additional detail below, with the invention encompassing all the embodiments indicated above and below, both individually and, where appropriate, in combination with one another.

DETAILED DESCRIPTION

Figure 1:
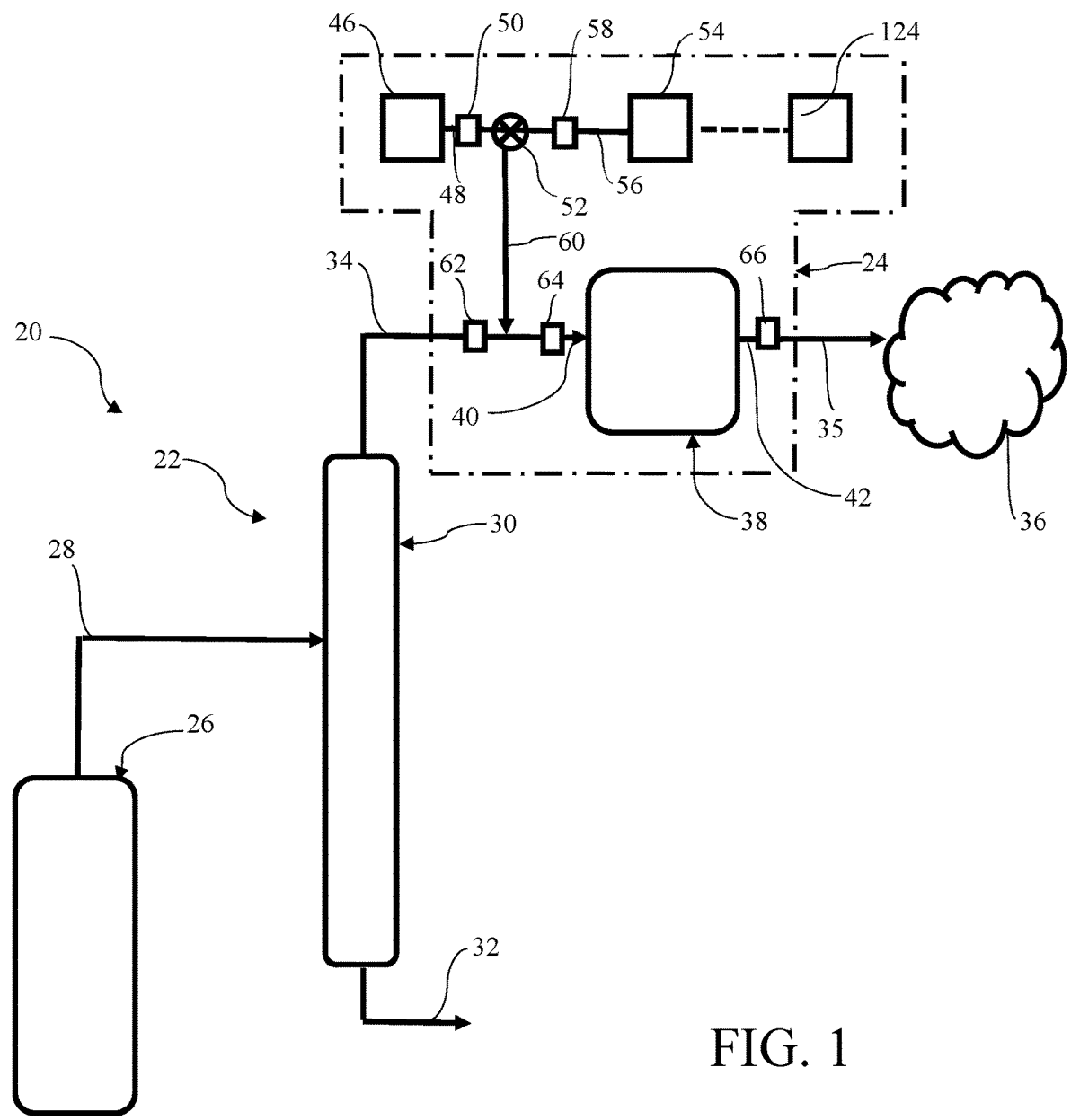
FIG. 1 is a schematic view of an example of a present invention FCC unit assembly comprising an FCC unit and an associated catalytic system.

FIG. 1 illustrates, in partial and schematic fashion, an example of an FCC unit assembly 20 comprising FCC unit 22 and an associated catalytic system 24. In FIG. 1, FCC unit 22 is shown in part (e.g., some standard FCC components, as in an upstream regenerator, are not shown as the emphasis is on the pertinent flue gas flow components leading to atmosphere). Thus, FIG. 1 shows, schematically, a conventional FCC unit reactor 26, in which is processed a feed (e.g., heavy oil) as to generate a reactor effluent (e.g., an overhead hydrocarbonaceous gas stream) that exits the reactor along line 28.

The gas stream travelling along line 28 is fed to main distillation (or fractionation) column 30 wherein the hydrocarbonaceous gas stream is distilled into desired products (e.g., light cycle oil) and wherein the higher boiling point hydrocarbons are removed from main distillation column 30 via bottom conduit 32 while lower boiling point components including HCN are removed from column 30 via conduit 34. Conduit 34 directs these lower boiling components, including HCN, into catalytic system 24; whereupon, after catalytic treatment, the exiting gas is fed downstream via outlet conduit 35 as to, for example, a stack or an additional treatment zone (neither shown) and typically ultimately to atmosphere 36.

Figure 2A:
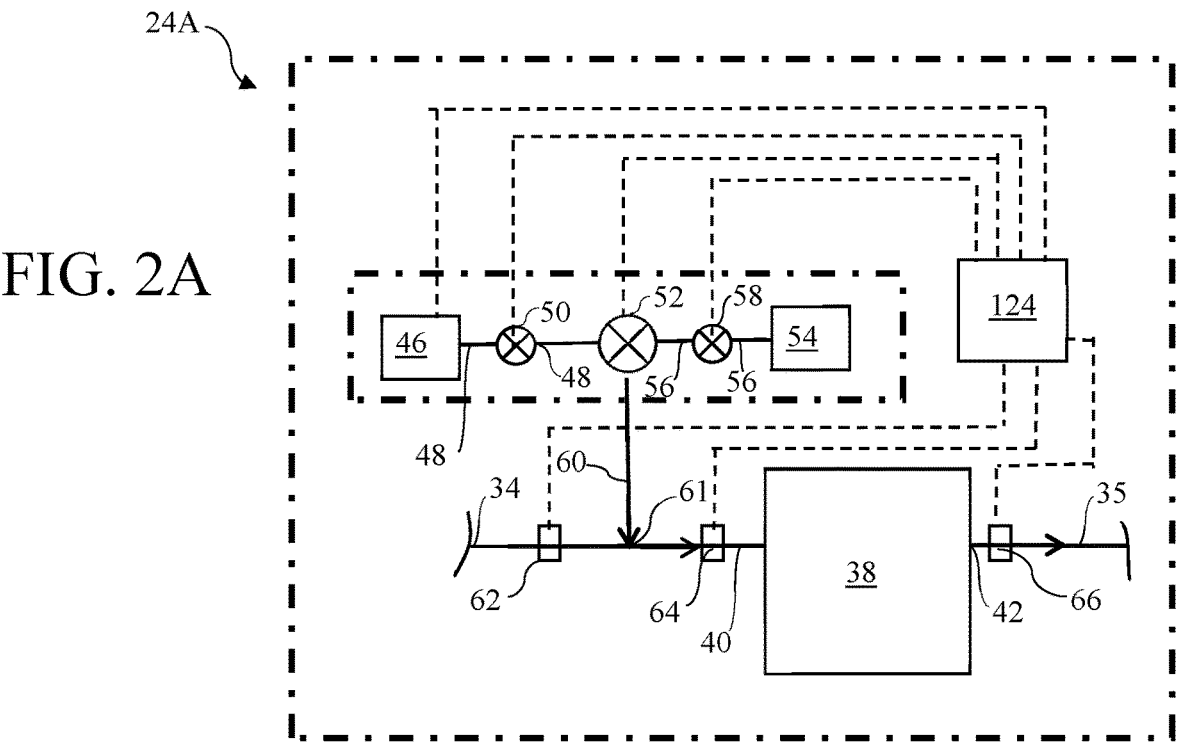
FIG. 2A shows in greater detail the embodiment of the catalytic system shown in FIG. 1.

As depicted in FIGS. 1 and 2A, catalytic system 24 includes catalyst reactor 38 with a more detailed description of its constitution described in greater detail below. The exhaust or flue gas flow passing within conduit 34 enters flow inlet end 40 of catalyst reactor 38; and then is treated by catalyst reactor 38, whereupon the treated gas flow exits at outlet end 42 of reactor 38 out along exit conduit 35 (with an example of conduit 35 being one that can involve an exit stack or exit stack portion leading the off-gas of the FCC unit to atmosphere 36, or a line leading to another treatment zone).

Shown in FIGS. 1 and 2A are additional components of catalytic system 24, including reductant feed source 46 (e.g., NH3 for use with an NH3-SCR (not shown in FIGS. 1 and 2A) forming part of catalyst reactor 38). Feed source 46 feeds into feed line 48 that leads to flow rate controller 50 that controls the sourced reductant feed amount (if any—as flow rate controller 50 can range from a blocking setting to a max flow potential setting). The downstream end of feed line 48 feeds into valve unit 52 (in this embodiment shown as a multi-way valve as in one having (off/left side flow only/right side flow only/and both sides flow)) potential settings.

FIGS. 1 and 2A further illustrate valve unit 52 being in flow communication with second (e.g. water for hydrolysis) source 54 (e.g., a heated water vapor generator that facilitates a hydrolysis breakdown within the reactor 38 per the discussion below) via feed line 56. Line 56 is also shown with flow rate controller 58 similar to the above described flow rate controller 50 and which also feeds into valve unit 52.

Feed line 60 extends from valve unit 52 into fluid communication with the flowing exhaust gas in line 34 at an illustrated injection location 61. Although not shown (as such devices are conventional in nature) the feed relationship between the downstream end of feed line 60 is inclusive of an injector device being used to spray, atomize, or otherwise inject the material flowing through line 60 as to mix with the exhaust gas flowing in line 34. Such injection devices for distributing the ammonia or ammonia precursor within the flue gas (preferably sufficiently prior to reaching the catalyst reactor 38 as to facilitate full dispersion) include distribution arrays or grids with examples found, for instance, in US 2013/0104519, as well as in U.S. patent application Ser. No. 17/494,434 filed Oct. 5, 2021 (Now U.S. Pat. No. 11,635,010) which describes various resolution ammonia injector grids; and which US Patent application is incorporated herein by reference for informational purposes only.

The injection location schematically depicted in FIGS. 1 and 2A further illustrates a location of the injection system upstream (with respect to the exhaust flow passage leading to release) of inlet 40 of reactor 38. Such an injection location can be limited to upstream of the most upstream SCR component (whether a DFC or SCRart), but can potentially also be configured to supply such ammonia or ammonia precursor upstream of more than the upstream most SCR component, as in a distribution system that feeds to each of a first and second set of SCR components (any combination of the noted DFC and SCRart described SCR components inclusive of a direct feed both upstream and between any pair of catalyst means or SCR components that represent catalyst reactor 38 (some examples of which are discussed below).

FIGS. 1 and 2A still further show sensor devices 62, 64 and 66, with sensor device 62 being shown as upstream of the injection location 61 for feed line 60 into flue gas flow conduit 34; and thus also upstream of inlet 40 of catalyst reactor 38. Sensor device 64 is shown downstream of injection location 61, while upstream of inlet 40 of reactor 38. Sensor device 66 is shown downstream of reactor outlet 42 as to facilitate the operation of sensor means 66 used for sensing one or more characteristics of the exiting flue gas. Each of sensor devices 62, 64 and 66 is designed to monitor one or multiple characteristics of the gas flow passing thereby as in temperature and/or one or more pollutant content levels. For instance, output sensor device 66 is configured for monitoring HCN slip past reactor 38 as by direct sample monitoring. Suitable HCN sensors that can be representative of sensor device 66 includes those that are placed in line for receiving flue gas travelling in line 35, as by direct in line 35 monitoring (as in provided in an exit stack of the FCC unit) or via a redirected flue gas stream (a sample flue gas branch line) or those that can receive and analyze a sample drawn from the noted flue gas line 35 (in which case sensor device 66 is in the form of a sample supply means used in a sensing process). For example, sensor device 66 (or sampler means 66 in some situations) can be represented by a Fourier-transform infrared spectroscopy sensor ("FTIS sensor"), as in one that is in line 35 or receiving flue gas from line 35 via a branch line or at another location that receives a supply sample. Additional sensor device 66 embodiments includes detection means for direct monitoring of HCN levels passing downstream of catalyst reactor 38 such as those that can detect and quantify HCN in the flue gas, such as through use of one or more of various analytical methods involving at location or via sample send out techniques, such as time-of-flight ion mobility spectrometry (ToF IMS), VIS spectrophotometry (e.g., UV-VIS or ultraviolet-visible spectrophotometry), gas chromatography coupled with mass spectrometry (GC/MS), liquid chromatography in tandem with mass spectrometry (LC/MS), mass spectrometry, and electrochemical methods (e.g., potentiometry using cyanide-specific electrodes, ion chromatography, or direct current amperometry).

An alternate technique for monitoring of HCN levels (or means for monitoring HCN levels) is one that monitors indirectly through extrapolation, as via sensed CO levels exiting catalyst reactor 38 (e.g., as per the hydrolysis formula (6) above, the breakdown of HCN via a hydrolysis can lead to an increase in CO; and, as such, the CO levels can be informative of HCN levels (preferably with added potential variable reduction control requirements as from the standpoint of flue gas VOCs can increase CO levels as well under certain instances)).

While the three sensor means or devices 62, 64 and 66 have been shown relative to facilitating the monitoring of performance parameter(s) of reactor 38, less or more are also contemplated under the present invention; as in only one sensor device upstream (either of sensor devices 62 and 64) and one sensor device 66 downstream of catalyst reactor 38. Alternatively, only sensor device 66 can be relied upon (e.g., monitoring of HCN only as in a dedicated HCN catalyst reactor 38 or only monitoring for output pollutants using 66 alone) functioning with or without other catalyst systems upstream or downstream. Also, each of the noted sensor means or devices 62, 64 and 66 can have one or more individual sensors working toward providing the desired information used in the noted monitoring at the designated location region (e.g., a combination of different sensed flue gas components or a combination of one or more flue gas components and a physical characteristic as in one or more (or any combination) of flue gas temperature, flow rate, and line pressure).

FIGS. 3A to 3L show respective catalyst reactor configurations for use in line with the FCC flue gas passageway 34 (shown downstream of main distillation column—noting in some FCC unit systems there is undertaken potential pollutant removal upstream of the distillation column as in SOx scrubbers or cyclone catalyst reactions for the reduction of potential pollutants prior to reaching the distillation column).

Prior to a discussion of the various alternate embodiments for catalyst reactor 38 in the catalytic system 24 there is provided some definitions to facilitate a better appreciation of the catalyst attributes featured under the present invention (plus some additional definitions relative to the interrelationships of the catalyst attributes in the context of the catalytic systems 24 described herein and/or relative to the FCC unit assembly 20 in general).

That is, a "catalytically active composition" (or "catalyst" or "catalyst composition" as short hand versions where applicable in context) is a substance or a mixture of substances which is capable of converting one or more components of an exhaust gas into one or more other components. An example of such a catalyst is, for instance, an oxidation catalyst or an oxidation catalyst composition which is capable of converting volatile organic compounds and carbon monoxide to carbon dioxide. Another example of such a catalyst is, for example, a selective reduction catalyst (SCR catalyst) or an SCR catalyst composition which is designed for converting nitrogen oxides to nitrogen and water (e.g., an SCR catalyst composition represented by the catalytically active composition vanadium pentoxide). In the context of the present invention, a catalytic article having an SCR functionality is a catalytic article comprising an SCR catalyst or an SCR catalyst composition.

A "catalyst carrier material" is material onto which the catalytically active composition can be affixed (such as affixed on an exterior porous particle exterior and/or inside the pores of such a particle), e.g. titanium dioxide, alumina, silica, or molecular sieves such as zeolite/zeotypes.

Thus, such catalyst carrier material is designed to receive a catalyst or catalyst composition, and which can be provided together (as in a washcoat or dry impingement spray) for attachment to, for example, a below described catalyst support substrate. It is also noted that materials such as inorganic base metal oxides as in $Al_2O_3$ (aluminum oxide or alumina), $SiO_2$, $TiO_2$, $CeO_2$, $ZrO_2$, $V_2O_5$, $La_2O_3$ and zeolites can have a variety of uses when in a washcoat setting. These usages include usage as "catalyst carrier material" per the above, as well as usage as washcoat promoters or stabilizers, while some also exhibit catalytic activity of their own.

A molecular sieve is a material with pores, i.e. with very small holes, of uniform size. These pore diameters are similar in size to small molecules, and thus large molecules cannot enter or be adsorbed, while smaller molecules can. In the context of the present invention, a molecular sieve is preferably zeolitic. Zeolites are made of corner-sharing tetrahedral $SiO_4$ and $AlO_4$ units. They are also called "silicoaluminates" or "aluminosilicates". In the context of the present invention, these two terms are used synonymously.

As used herein, the terminology "non-zeolitic molecular sieve" refers to corner-sharing tetrahedral frameworks wherein at least a portion of the tetrahedral sites are occupied by an element other than silicon or aluminum. If a portion, but not all silicon atoms are replaced by phosphorous atoms, it deals with so-called "silico aluminophosphates" or "SAPOs". If all silicon atoms are replaced by phosphorous, it deals with aluminophosphates or "AlPOs".

A "zeolite framework type", also referred to as "framework type", represents the corner-sharing network of tetrahedrally coordinated atoms. It is common to classify zeolites according to their pore size which is defined by the ring size of the biggest pore aperture. Zeolites with a large pore size have a maximum ring size of 12 tetrahedral atoms, zeolites with a medium pore size have a maximum pore size of 10 and zeolites with a small pore size have a maximum pore size of 8 tetrahedral atoms. Well-known small-pore zeolites belong in particular to the AEI, CHA (chabazite), ERI (erionite), LEV (levyne), AFX and KFI framework. Examples having a large pore size are zeolites of the faujasite (FAU) framework type and zeolite Beta (BEA).

A "zeotype" comprises any of a family of materials based on the structure of a specific zeolite. Thus, a specific "zeotype" comprises, for instance, silicoaluminates, SAPOs and AlPOs that are based on the structure of a specific zeolite framework type. Thus, for example, chabazite (CHA), the silicoaluminates SSZ-13, Linde R and ZK-14, the silicoaluminophosphate SAPO-34 and the aluminophosphate MeAlPO-47 all belong to the chabazite framework type. The skilled person knows which silicoaluminates, silico aluminophosphates and aluminophosphates belong to the same zeotype. Furthermore, zeolitic and non-zeolitic molecular sieves belonging to the same zeotype are listed in the database of the International Zeolite Association (IZA). The skilled person can use this knowledge and the IZA database without departing from the scope of the claims.

The silica to alumina ratio ($SiO_2$:$Al_2O_3$) of the zeolites is hereinafter referred to as the "SAR value".

A "catalyst support substrate" is a support to which the catalyst or catalyst composition is affixed and shapes the final catalyst. Examples, include monolithic catalyst support structures such as the well-known honeycomb wall-flow, flow-through and corrugated sheets monoliths. The catalyst support substrates are design as to enable exhaust gas to travel there along as to facilitate a desired form of catalytic contact with the catalyst composition provided thereon. The catalyst support substrate is thus a support substrate for the catalyst or catalyst composition (and can also represent a support substrate for catalyst carrier material, if such is utilized to hold the catalyst or catalyst composition (as often found in washcoat applications)).

A "washcoat" as used in the present invention is an aqueous suspension of a catalytically active composition (e.g., an aqueous suspension having the catalytically active composition and catalyst carrier material(s) such as described above, whereupon following application of the washcoat to the catalyst support substrate; and following, for instance, calcination, the catalytically active composition is provided in and/or on the catalyst carrier material(s) with the combination mutually supported on the catalyst support substrate).

A washcoat which has been affixed to a catalyst support substrate is called a "coating". It is also possible to affix two or more washcoats to the catalyst support substrate. The skilled person knows that affixing two or more washcoats onto one single catalyst support substrate is possible by "layering" or by "zoning", and it is also possible to combine layering and zoning. In case of layering, the washcoats are affixed successively onto the catalyst support substrate, one after the other. The washcoat that is affixed first and thus in direct contact with the catalyst support substrate represents the "bottom layer", and the washcoat that is affixed last is the "top layer". In case of zoning, a first washcoat is affixed onto the catalyst support substrate from a first face side A of the catalyst support substrate towards the other face side B, but not over the entire length of the catalyst support substrate, but only to an endpoint which is between face sides A and B. Afterwards, a second washcoat is affixed onto the catalyst support substrate, starting from face side B until an endpoint between face sides B and A. The endpoints of the first and the second washcoat need not be identical: if they are identical, then both washcoat zones are adjacent to one another. If, however, the endpoints of the two washcoat zones, which are both located between face sides A and B of the catalyst support substrate, are not identical, there can be a gap between the first and the second washcoat zone, or they can overlap. As mentioned above, layering and zoning can also be combined, if, for instance, one washcoat is applied over the entire length of the catalyst support substrate, and the other washcoat is only applied from one face side to an endpoint between both face sides.

In the context of the present invention, the "washcoat loading" is the mass of the catalytically active composition and optionally the binder, if the washcoat comprises a binder, per volume of the catalyst support substrate.

The skilled person knows that washcoats are prepared in the form of suspensions and dispersions.

Suspensions and dispersions are heterogeneous mixtures comprising solid particles and a solvent. The solid particles do not dissolve, but get suspended throughout the bulk of the solvent, left floating around freely in the medium. If the solid particles have an average particle diameter of less than or equal to 1 μm, the mixture is called a dispersion; if the average particle diameter is larger than 1 μm, the mixture is called a suspension. Washcoats in the sense of the present invention comprise a solvent, usually water, and suspended or dispersed particles represented by particles of one or more the catalytically active compositions, and optionally particles of at least one catalyst carrier material as described above. This mixture is often referred to as the "washcoat slurry". The slurry is applied to the catalyst support substrate and subsequently dried to form the coating as described above. In the context of the present invention, the term "washcoat suspension" is used for mixtures of solvents, particles of one or more catalytically active compositions, and optionally particles of at least one catalyst carrier material, irrespective of the individual or average particle sizes. This means that in "washcoat suspensions" according to the present invention, the size of individual particles as well as the average particle size of the one or more catalytically active solid particles can be less than 1 μm, equal to 1 μm and/or larger than 1 μm.

The term "mixture" as used in the context of the present invention is a material made up of two of more different substances which are physically combined and in which each ingredient retains its own chemical properties and makeup. Despite the fact that there are no chemical changes to its constituents, the physical properties of a mixture, such as its melting point, may differ from those of the components.

A "catalytic article" in the context of the present invention comprises a catalyst support substrate and a catalyst or catalyst composition provided with said catalyst support substrate. As a few examples, a catalytic article under the present invention is inclusive of (1) and (2) described below (together with respective examples as to formation techniques thereof).

1. A coated substrate monolith:
   a) Formation of the monolith (example):
      Prepare an (aqueous) of the inert material, e.g. cordierite, which shall form the monolith.
      inert material equals the monolith material.
      Form a monolith (can be by extrusion).
   Dry and calcine the monolith thus obtained. (the monolith thus obtained has channels.)
   b) Preparation of the washcoat:
      Prepare an aqueous washcoat comprising the catalytically active substance (e.g. a copper-loaded zeolite, or vanadium on titania, or a precious metal, etc.) and optionally a binder, and optionally an additive (e.g. a rheology modifier).
   c) Coating of the monolith:
      Coat the monolith obtained in a) with the washcoat obtained in b).
      Methods for coating: e.g. dip-coating (dip the monolith to be coated into the slurry), or soak it through the monolith under vacuum or pressure.
      Optionally: remove excess washcoat (by vacuum or pressure).
      Dry and calcine the coated monolith.
   Result: A catalysed substrate monolith wherein the (dried and calcined) washcoat forms a layer in or on the walls of the monolith.

2. An extruded substrate monolith:
   Prepare an (aqueous) slurry of the inert monolith material (e.g. cordierite) and the catalytically active substance and optionally a binder/rheology modifier.
   Extrude this mixture.
   Result: A catalysed substrate monolith wherein the channel walls consist of homogenously distributed inert matrix material and catalytically active substance. In this case there is no separation between the inert matrix material and catalytically active substance, because of homogeneous mixture of them has been extruded.

As an example of a catalytic article according to the present invention reference is made to a "dual function catalyst" (DFC) with the term "dual" being used because it has both an oxidation and a reduction functionality: the DFC is capable of oxidizing volatile organic compounds and carbon monoxide to carbon dioxide and water. Additionally, the DFC can reduce nitrogen oxides to nitrogen and water as in the presence of ammonia. This means that the DFC also has an SCR reduction functionality, or more particularly an NH3-SCR reduction functionality.

A "catalyst device" is represented by one of more catalytic articles. When represented by multiple catalytic articles, the catalyst device can constitute a single catalyst support substrate with the catalytic articles represented by different zones and/or layers on that catalyst support substrate, or can constitute independent catalytic articles in flush contact (abutting catalyst substrate supports or abutting substrate casings of the catalytic articles) or flue gas stream separated independent catalytic articles such as those with an in-between or a bridging flow conduit, inclusive of independent catalytic articles stored in a common housing or passageway.

A "catalyst reactor" comprises the catalyst device (with one of more catalytic articles) as well as means for supplying flue gas into contact with the one or more catalytic articles such as a housing with appropriate conduits for directing the flue gas into catalytic contact with said catalytic article(s) or a section of the general flue gas conduit receiving the catalyst device.

The terms "exhaust gas", "flue gas" or "off-gas", as used in the context of the present invention refers to gases emitted as a result of the combustion of fuels such as natural gas, gasoline, petrol, biodiesel blends, diesel fuel, fuel oil, or coal. Thus, a reference to an FCC off-gas (or flue gas or exhaust gas) is one that is generated under an FCC process.

An "unpurified" or "uncleaned" exhaust gas, flue gas or off-gas is a gas as defined above which has not yet passed through an exhaust gas purification system (e.g., a catalytic system).

"Upstream" and "downstream" are terms relative to the normal flow direction of the off-gas in the exhaust pipeline. An "object, article or device 1 which is located upstream of an object, article or device 2" means that object 1 is positioned, with respect to flue gas travel, closer to the source of the off-gas, i.e. closer to the FCC's main distillation column's output. In this case, object 2 is located "downstream" of object 1, i.e. object 2 is further away from the source of the off-gas than object 2. The flow direction is from the source of the off-gas to release, as in a chimney (or stack) or exhaust pipe or conduit outlet to atmosphere.

The "inlet end" of a catalytic article is the end which is directed towards the combustion source, and the "outlet end" is the end directed to the stack or atmospheric outlet with respect to exhaust flow.

The reduction of nitrogen oxides to nitrogen and water is well known as an SCR reaction, and it is also known that an SCR reaction is one that is often used with ammonia (NH3—SCR). This can be compared to an "HC—SCR" which detoxifies NOx with unburned hydrocarbon (HC) in the exhaust gas; and thus uses the fuel decomposition product HC as a reducing agent (without the type of reliance on ammonia as per the "NH3-SCR" system). A preferred system according to the present invention for many contemplated environments, inclusive of an environment of treating flue gas from an FCC unit, is the "NH3-SCR" system; and, in such use, the present invention also preferably comprises a source of ammonia and means for introducing ammonia (with "ammonia" being in the sense of direct ammonia feed or a precursor to ammonia feed to the flue gas as to provide ammonia in the flue gas conduit). In the discussion below reference to "SCR" is in the context of an NH3-SCR type SCR component unless stated otherwise.

The source of ammonia can be ammonia as such or an ammonia precursor which is capable of releasing ammonia. The source of ammonia is preferably selected from aqueous ammonia, anhydrous ammonia, an aqueous urea solution, an aqueous ammonium formate solution and ammonium carbamate and mixtures thereof, more preferably anhydrous ammonia, aqueous ammonia, or an aqueous urea solution. Anhydrous ammonia NH3 can be used as a gas or a liquid. Suitable ammonia precursors are, for instance, urea, ammonium carbamate and ammonium formate, preferably urea. The precursors are hydrolyzed to ammonia upon heating. An aqueous urea solution, for instance, hydrolyses at temperatures above 130° C., thereby releasing ammonia. Off-gases of FCC units when operating normally can be expected to have temperatures above 130° C.; and, thus, an aqueous urea solution will easily hydrolyze when introduced into an SCR catalyst within such a plant. Aqueous ammonia can also be effectively decomposed when injected as fine particles into a gas stream of at least 350° C.

The anhydrous ammonia, aqueous solution of ammonia, or the ammonia precursor is preferably stored in a container, added to the off-gas stream as needed, and it is introduced at the inlet side of the catalytic article of interest. Containers for storing as well as means for introducing anhydrous ammonia, aqueous solutions of ammonia or an ammonia precursor at the inlet side of an SCR catalyst are, per se, well known in the art, and can be applied within the system of the present invention without departing from the scope of the claims. In the context of the present invention, the term "means for introducing ammonia" encompasses means for introducing ammonia as such as well as means for introducing ammonia precursors. Preferably, the container comprises anhydrous ammonia, aqueous ammonia, or an aqueous urea solution. A suitable means for introducing the aqueous ammonia solution or the aqueous ammonia precursor solution is via an injector located upstream, i.e. at the inlet side, of the catalyst device. These means for supplying the reagent to the flue stream include distribution arrays or grids (e.g., an "ammonia injection grid") with examples found, for instance, in US 2013/0104519, as well as in U.S. patent application Ser. No. 17/494,434 filed Oct. 5, 2021 (Now U.S. Pat. No. 11,635,010) which describes various resolution ammonia injector grids, and which US Patent application is incorporated herein by reference for informational purposes only.

Also, aspects of the invention involve controlled usage of H2O to provided desired levels of hydrolysis of HCN in the catalytic system, which can include usage of the H2O found in aqueous ammonia sources such as the aforementioned aqueous ammonia and aqueous urea solution sources. Aqueous ammonia is often supplied in 29% ammonia solutions while aqueous urea typically is supplied as a 32.5% urea solution. Under embodiments of the present invention there is provided means to alter that percentage, as in adding H2O to the ammonia supply (e.g., a water feed pipe supplying to a urea solution or aqueous ammonia solution container—or via a downstream location including intermixing in the flue passageway or in conjunction with ammonia injection at the grid or similar injection site) being added to the off-gas stream as to, for example, supply additional H2O to the hydrolysis breakdown of HCN per formula (6) above.

In a preferred embodiment of the present invention, the means for introducing ammonia into the off-gas is a means for introducing aqueous ammonia or aqueous urea via an ammonia injection grid such as those described above.

The catalyst support substrate is selected from flow-through substrates, wall-flow substrates and corrugated substrates. Wall-flow substrates and flow-through substrates may consist of inert materials, such as silicon carbide, aluminum titanate, cordierite, metal or metal alloys. The inert materials can, for instance, be extruded as such and subsequently coated with at least one washcoat comprising a catalyst composition and/or via a dry impinging process to attach the catalyst material to the catalyst support substrate. It is also possible to mix the inert materials for the wall-flow substrate or the flow-through substrate with the catalyst material or precursors thereof to form a paste and to extrude this mixture to obtain a catalytic article as defined above in one step. Furthermore, the substrate can be selected from ceramic candle filters, bag filters or catalyst pellets or beads.

Such catalyst support substrates are well-known to the skilled person and available on the market. In a preferred embodiment, the catalyst support substrate is a corrugated substrate monolith.

In a preferred embodiment, the corrugated substrate monolith is a paper of high silica content glass or a paper of E-glass fiber, and it is provided with the at least one washcoat and/or impinged with the catalyst composition.

Methods for preparing washcoats or methods for impinging catalyst compositions, for applying them to catalyst support substrates, and also methods for making extruded catalytic articles are well-known to the skilled person. They can be applied in the context of the present invention without departing from the scope of the claims.

The catalyst or catalyst composition can be located "in-wall" (e.g., catalyst composition carrying particulate carrier material with a particle size such as a porous alumina particle supporting a platinum group metal that can reach significantly internally within a porous wall of a catalyst support substrate) and/or "on-wall" as in catalyst composition carrier material supported primarily on the walls of the catalyst support substrate (e.g., a particle size for primarily bridging in-wall pores of the wall as to apply a surface coating on channels in the like in the catalyst support substrate). Preferably, the catalyst or catalyst composition is located in the walls of the catalyst support substrate, or on the walls of the catalyst support substrate, or a combination of both in-wall and on-wall. With the aforementioned corrugated catalyst support substrate of paper of high silica content glass or a paper of E-glass fiber, an application that is inclusive (at least in part) of in-wall application of the catalyst composition is preferred as it can help strengthen the overall catalytic article.

The catalyst or catalyst composition of the catalytic article having both an oxidation and an SCR functionality preferably comprises at least one platinum group metal and/or at least one platinum group metal oxide, at least one oxide of titanium and at least one oxide of vanadium. An example of which can be found in that aforementioned WO2014124830.

The at least one platinum group metal and/or at least one platinum group metal oxide is selected from ruthenium, rhodium, palladium, osmium, iridium, platinum and the oxides thereof. If more than one platinum group metal is present, it can involve physical mixtures, alloys, or mixtures of physical mixtures and alloys of the platinum group metals and/or their oxides. If, for instance, platinum and palladium are chosen, they can be present as a) a physical mixture, b) an alloy of platinum and palladium wherein neither pure platinum or pure palladium are present, or c) an alloy of platinum and palladium as described under b) and additionally pure platinum and/or pure palladium. If oxides of more than one platinum group metal are present, they can be present as a) mixtures of oxides of the same metal in various oxidation states, b) mixtures of oxides of different metals in one or more oxidation states, c) oxides of alloys or d) combinations of mixtures of oxides of one or more metals in various oxidation states and mixtures of oxides of different metals. Furthermore, the platinum group metals and platinum group metal oxides as listed above can be present concomitantly.

Preferably, the at least one platinum group metal is selected from palladium, platinum, iridium and mixtures, alloys, oxides and mixtures of alloys, oxides and physical mixtures. Even more preferably, the at least one platinum group metal is palladium and/or palladium(II) oxide PdO.

In a preferred embodiment, the catalyst support substrate is a corrugated substrate, and the catalyst or catalyst composition is located in and/or on the walls of the catalyst substrate, and preferably both in-wall and on-wall as described above. In this embodiment, the total weight of the catalytic article is the sum of the amounts of the at least one platinum group metal and/or at least one platinum group metal oxide, the amount of the at least one oxide of titanium, the amount of the at least one oxide of vanadium and the amount resp. the weight of the catalyst support substrate. The amounts of the at least one platinum group metal and/or at least one platinum group metal oxide, the amount of the at least one oxide of titanium and the amount of the at least one oxide of vanadium of this embodiment are given hereinafter.

The at least one platinum group metal and/or platinum group metal oxide is present in the catalytic article in an amount of 50 to 10,000 ppmw, preferably 100 to 3000 ppmw, even more preferably 200 to 2000 ppmw, calculated as the pure precious metal and based on the total weight of the catalytic article. The unit "ppmw" stands for "part per million per weight". Preferably, the at least one platinum group metal is palladium. As used herein a "high" load of the at least one platinum group metal and/or platinum group metal oxide is considered one falling above the upper half level of the noted 200 to 2000 range; and a "low" load is considered to be one that falls in the lower half of the 200 to 2000 range. That is, a low load is represented by 200 to 1,100 ppmw, while a high load is greater than 1,100 to 2,000 ppmw.

The at least one oxide of titanium when present in the catalytic article is present in an amount of 60 to 90 wt.-%, preferably 65 to 85 wt.-%, and more preferably 70 to 80 wt.-%, calculated as TiO2 and based on the total weight of the catalytic article. In one embodiment, the at least one oxide of titanium is titanium dioxide (TiO2). Suitable titanium dioxides comprise at least 95 wt.-% of anatase, preferably at least 98 wt.-%, and even more preferably at least 99.5 wt.-%. The remainder for adding up to 100 wt.-% of TiO2 is represented by rutile and/or brookit, preferably by rutile. The at least one oxide of titanium serves as the washcoat carrier material.

The at least one oxide of vanadium, when present, is present in an amount of 0.1 to 17 wt.-%, preferably 0.6 to 5 wt.-%, more preferably 1.8 to 3.6 wt.-%, calculated as V2O5 and based on the total weight of the catalytic article. In one embodiment, the at least one oxide of vanadium is vanadium pentoxide (V2O5).

In one embodiment, the applied material (e.g., via a first washcoat application) additionally comprises at least one oxide of tungsten. The at least one oxide of tungsten is present in an amount of 0.001 to 10 wt.-%, preferably 2 to 7 wt.-%, more preferably 2.5 to 6 wt.-% and most preferably 2.7 to 3.3 wt.-%, calculated as WO3 and based on the total weight of the catalytic article. In one embodiment, the at least one oxide of tungsten is tungsten trioxide (WO3). In this embodiment, the total weight of the catalytic article is the sum of the amounts of the at least one platinum group metal and/or at least one platinum group metal oxide, the amount of the at least one oxide of titanium, the amount of the at least one oxide of vanadium, the amount of the at least one oxide of tungsten and the amount resp. the weight of the catalytic article.

The amount of HCN (and preferably also the amount of NOx and/or the ammonia slip) can be measured between the outlet end of the catalyst device and the stack or at the stack of the off-gas cleaning system in order to control the efficiency of the off-gas cleaning. In all embodiments of the present invention, the amount of HCN (and preferably also NOx and/or the ammonia slip) are preferably measured at the stack.

The respective amount of HCN can be determined either directly or indirectly as per the above described techniques. Further, the amount of HCN reaching the inlet of the catalyst reactor can also be determined and utilized to determine the HCN reduction capability across the catalyst device.

A measurement of NOx (if carried out in addition to the HCN determination) can be determined, for instance, by a chemiluminescence detector (CLD), Fourier transform infrared spectroscopy (FTIR), or infrared spectroscopy (IR). These means to determine the amount of NOx are well known to the skilled artisan and can be applied in the present invention without departing from the scope of the claims.

As an alternative to the measurement of the amount of NOx as described above or in addition thereto, and as a supplement to the HCN measurements, it is also possible to measure the ammonia slip (NH3 slip) between the outlet end of the catalytic article and the stack or at the stack of the off-gas cleaning system. Ammonia exhausted at the stack of an off-gas cleaning system is known as "ammonia slip". The ammonia slip is usually measured by FTIR. The measurement of the ammonia slip can be carried out with the above described HCN determination and can take place in addition or as an alternative to the measurement of the amount of NOx between the outlet end of the catalytic article and the stack or at the stack.

Optionally, it is also possible to measure the amount of CO emitted between the outlet end of the catalyst device and the stack or at the stack. This measurement preferably takes place in addition to the HCN measurement and can take place in addition to the measurement of the amount of NOx and/or the NH3 slip between the outlet end of the catalytic article and the stack or at the stack. A suitable means for the measurement of CO is, for instance, the non-dispersive infrared analyzer (NDIR). Means and methods for measuring CO are well-known to the skilled person and can be applied in the context of the present invention without departing from the scope of the claims. As described above, for the measurement of the amount of NOx and/or the ammonia slip, the measurement of CO also preferably takes place at the stack.

The CO measurement can also be extrapolated in an effort to determine the considered HCN level (as through a control unit extrapolation determination knowing the anticipated hydrolysis level relative to, for example, (and also preferably controlled) water vapor feed volume in the flue gas and with potential additional consideration as in the level of VOCs anticipated as being involved, as in based on information for a control unit stored FCC unit operation and feed type and amount as well as any upstream to catalytic article sensing of the same).

In one embodiment of the present invention, the DFC is the only catalytic article having an SCR function in the catalytic system for the removal of the HCN (preferably for the removal of HCN together with NOx, and preferably additional pollutants such as volatile organic compounds, carbon monoxide). In this embodiment, the means for introducing ammonia are located sufficiently upstream of said catalytic article as to facilitate a good, full volume dispersion at the time of reaching the catalytic article, and the means for measuring the HCN and, preferably, also any one or combination of NOx; the ammonia slip, or the CO emitted is provided between the outlet end of the DFC and the stack or at the stack, preferably at the stack.

In another embodiment of the present invention, a PGM free SCR catalytic article (or "SCRart") is present alone or together with (as in upstream or downstream or both) the DFC. By contrast to the DFC, said SCRart only has a selective catalytic reduction functionality, but no oxidation functionality. In case of an SCRart being upstream (most upstream of the SCR components) of the DFC, the means for introducing ammonia are located preferably upstream of the SCRart to achieve a desirable ammonia dispersion level at the time of reaching the SCRart. This means that the SCRart is located between the means for introducing ammonia and the DFC when there is a upstream SCRart and a downstream DFC series combination. In this embodiment, the means for measuring the amount of HCN is preferably provided downstream of the DFC (after gas passage through each catalytic article) or a combination of sensing between the SCRart and DFC as well as downstream of the DFC. Such HCN sensing can be in combination with means for measuring one or any possible combination of the pollutants: NOx ammonia slip, and the CO emitted, which sensing preferably includes sensors that are also located between the outlet end of the DFC and the stack or additionally between the upstream SCRart and the DFC, for an initial insight as to the amount or reduction (e.g., HCN) carried out by the SCRart prior to reaching the downstream DFC wherein the flue gas is further treated for the subsequent release downstream of the downstream DFC.

The above described potential sensor location set ups for the upstream SCRart and downstream DFC is also available for a reverse sequence of a most upstream DFC and a downstream SCRart. Thus, in yet another embodiment of the present invention, an SCRart is present downstream of the DFC. In case of an SCRart downstream of the DFC, the means for introducing ammonia are preferably located directly upstream of the DFC or upstream of both the DFC and the SCRart. In other words, in embodiments of the invention, the means for introducing ammonia is either located upstream of the DFC; or upstream of the DFC and also between the DFC and the SCRart.

In this embodiment, the means for measuring the amount of HCN is preferably provided downstream of the SCRart (after gas passage through each catalytic article) or a combination of sensing between the SCRart and DFC as well as downstream of the SCRart. Such HCN sensing can be in combination with means for measuring one, or any possible combination of, the pollutants such as NOx, ammonia slip, and/or the CO emitted, which sensing preferably includes one or more sensors that are located between the outlet end of the SCRart and the stack; or additionally also between the upstream DFC and the SCRart, for an initial insight as to the amount or reduction (e.g., HCN) carried out by the DFC prior to reaching the downstream SCRart wherein the flue gas is further treated for the subsequent release downstream of the downstream SCRart.

In still another embodiment of the present invention there is present one or multiple DFCs in combination with one or multiple SCR catalytic article(s) ("SCRart"). As an example (in an upstream to downstream sequence) a sequence of DFC-SCRart-DFC (representing one SCRart and multiple DFC's) or a sequence of SCRart-DFC-SCRart (representing one DFC and multiple SCRart's) or a SCRart-SCRart-DFC (representing another example of a multiple SCRarts and one DFC). A suitable representative for an SCRart is a DNX® series SCR catalyst available from the Umicore Company (with the registered trademark DNX® repeated below in the short hand version "DNX" for convenience). Also, a suitable representative for a DFC is a DNO® series catalyst also available from the Umicore Company (with the registered trademark DNO® repeated below in the short hand version "DNO" for convenience).

An example of the constitution for a DNX "non-dual" type SCR, is described above and can also be seen in the constitution of the catalyst device described in U.S. Pat. No. 7,431,904 B2 to Høj. Further, the DFC described herein is inclusive of the aforementioned DNO, with an example of this type catalyst device being described above and also represented by WO 2014/124830 A1 to Castellino et al. and WO 2017/220473 A1 to Pedersen et al. As seen therein, the DNX catalyst can thus include a corrugated fiber-reinforced titanium dioxide (TiO2) catalyst substrate support plate with the plates homogeneously impregnated with the active components such that the entire ceramic plate is composed of a uniform distribution of tungsten trioxide (WO3) and vanadium pentoxide (V2O5) in the manner described above. See also the discussion above of representative percentages by weight for the noted catalytic article components such as V2O5, TiO2, and WO3 and PGM for the DNO. The DNO can have a similar constitution as explained above for the DNX, plus (in conjunction with providing a dual function attribute) a zone (e.g., a downstream zone of the DFC under illustrative embodiments of the present invention) that features the addition of an impregnated precious metal solution (as in impregnation with a PGM such as a palladium solution with an example described in WO 2017/220473 A1).

The term "the means for measuring the amount of HCN (or preferably also the means for measuring any one or combination of NOx; the ammonia slip, or the CO emitted)" or "measuring means" below, preferably places the measuring means downstream of the catalytic article having an SCR catalytic function which is located closest to the stack (or, as noted, an additional preemptive monitoring between an upstream/downstream pair of SCR components (e.g., a pair in any sequence of a DNX and a DNO) in addition to measuring after the most downstream SCR component).

Various SCR catalytic articles (both SCRart without PGM and DFC with PGM) may comprise materials such as zeolites or metal oxides or a mixture of zeolites and metal oxides as SCR catalysts or catalyst compositions and/or as material carriers therefor.

Suitable zeolites are, for instance, small-pore aluminosilicate zeolites, selected from ACO, AEI, AEN, AFN, AFT, AFX, ANA, APC, APD, ATT, BIK, CDO, CHA, DDR, DFT, EAB, EDI, EPI, ERI, ESV, ETL, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures and intergrowths thereof. Preferably, the zeolites are chosen from AEI, AFT, AFX, CHA, DDR, ERI, ESV, ETL, KFI, LEV, UFI and mixtures and intergrowths thereof, and even more preferably, the zeolites are chosen from AEI, CHA, AFX. Furthermore, the small-pore zeolites preferably are provided with, for example, 0.1 to 10 wt.-% of a transition metal, calculated as the respective transition metal oxide and based on the total weight of the zeolite. Preferably, the transition metal is chosen from Fe, Cu and mixtures thereof, more preferably, the transition metal is copper. Also, the SAR range for the zeolites when used in the present invention is preferably as follows: 5 to 50, preferably 5 to 30, most preferably 7 to 25.

Suitable metal oxides for use in SCR catalyst compositions are, for example, mixtures of oxides of titania and vanadia as described above. Optionally, they may additionally comprise other oxides such as tungsten oxides, antimony oxides, niobium oxides, molybdenum oxides, cerium oxides, lanthanum oxides and mixtures thereof.

As used in the present invention, the term "nitrogen oxides", also written as NOx, refers to the entirety of nitrogen monoxide (NO) and nitrogen dioxide (NO2) which are present in the exhaust gas or off-gas, irrespective of the relative amounts of NO and NO2, respectively, in said exhaust gas or off-gas.

Thus, with reference to the above discussion relative to the catalytic articles of DFC(s) and/or SCRart(s) (i.e., non DFC SCR catalytic article(s)) in catalyst reactor embodiments of the present invention, presented below is a discussion of some examples inclusive of those represented in FIGS. 3A to 3L. In each case described below, a referenced SCRart can be exemplified by DNX; while a below referenced DFC can be exemplified by a DNO.

Also, throughout the application like reference numbers and letters (e.g., 38A and 38B) are used (or added 100s—as in 21/121/221 are used) to facilitate a reference to the same or at least somewhat commonly configured or situated components amongst the various embodiments, although such components can vary in value or attributes from one embodiment to the next despite the commonly used reference number (actual or base level as with 21 and 121) or letter; and, where feasible, under the purposes of the present invention, under some circumstances there can potentially be switched out one such same or at least somewhat commonly configured or situated component with another.

Figure 3A:
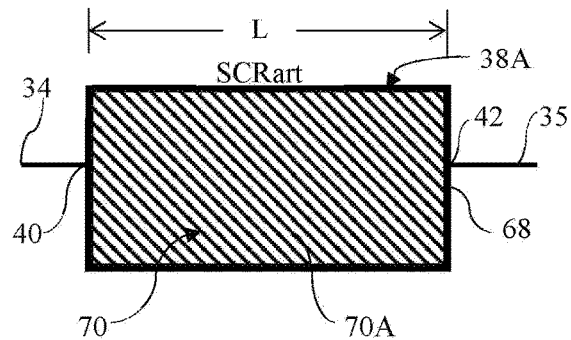
FIG. 3A to 3L show respective catalyst reactor configurations in line with the FCC flue gas.

FIG. 3A shows catalyst reactor 38A (which is an example of the generically noted catalyst reactor 38 in FIGS. 1 and 2A) for use in HCN removal from the FCC unit's flue gas (and, when present, preferably in conjunction with the simultaneous removal of other pollutants such as NOx (and as well preferably any remaining VOCs, CO traveling with the HCN in the flue gas (as well as any NH3 that may be present such as by way of the hydrolysis breakdown in chemical formula 6 above)).

Catalyst reactor 38A is schematically shown as including housing 68 having an inlet 40 receiving the flue gas flowing in line 34 and within which housing 68 (in this embodiment) is housed catalyst device 70 (which in this embodiment is limited to one catalytic article 70A). Also, while shown as a stepped up in size housing, the housing can also be represented by a continuation of conduit 34, as in an enlarged conduit configuration suitable for catalyst reactor in-line positioning. Catalytic article 70A, in this embodiment, is in the form of an SCRart only (i.e., a non DFC catalytic article). As shown in FIG. 3A housing 68 has an upstream to downstream (inlet to outlet) length of L, which in preferred embodiments (this embodiment and others described herein) is also the inlet end to outlet end of the catalyst device (70 in this embodiment).

Thus, the flue gas traveling through housing 68 and into catalytic contact with catalytic device 70A exits outlet 42 of housing 68 for passage through outlet conduit 35 (e.g., part of an exhaust stack or leading to an exhaust stack for off-gas release by the FCC unit). The SCRart can take on any one of the above/below described non-DFC form SCRs (e.g., an SCR component that is free of an active PGM oxidation catalyst). A well suited SCRart catalytic device 70A is a "DNX" SCRcat having the above described composition and configuration (e.g., non-dual function as without PGM). Thus, with a DNX catalytic article, the DNX has the aforementioned monolithic or integrated structure (e.g., the monolithic corrugation plus its own exterior casing as for stability and protection such as when being placed into housing 68). A suitable example of such a corrugated monolithic substance with casing can be seen in U.S. Pat. No. 8,323,600.

Also the material of catalyst reactor 38 in general (and thus inclusive of catalyst reactor 38A as well as any of the below described catalyst reactor 38B to 38M) is preferably designed for usage in an FCC unit off-gas stream (e.g., a post main distillation column off-gas stream), which in many situations is at or within a temperature of 550° F. to 800° F. Thus, catalyst reactor 38 (38A in this instance) is designed to catalytically function appropriately (e.g., achieve a desired level of HCN and NOx reduction without development of undesirable byproducts within the noted temperature range while also avoiding undue physical deterioration, as in undue sintering levels in the catalytic article's material).

Figure 3B:
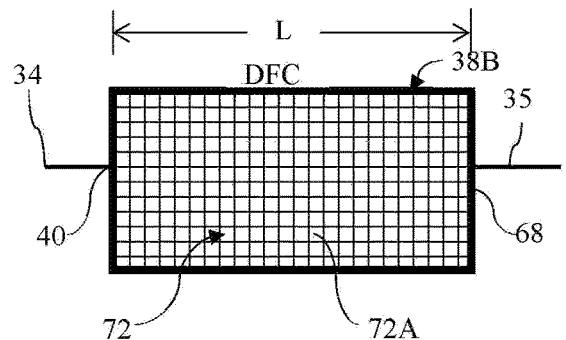

FIG. 3B shows catalyst reactor 38B which is designed for use in the same manner as 38A in FIG. 3A; and thus as a component of catalytic system 24 shown in the flue gas line in FIG. 1 which receives the FCC Unit's exhaust output. The difference between reactor 38A and 38B lies in a difference in the catalyst device contained in housing 68. That is, in FIG. 3B catalyst device 72 features usage of a DFC as the catalytic article 72A (in place of the SCRart catalytic article 70A described above within housing 68). The DFC catalytic article 72A can take on the form of any of the above/below described DFC forms such as the aforementioned DNO (preferably having the same corrugated monolithic support within a protective casing like that described above in U.S. Pat. No. 8,323,600) and which is a catalyst device that is utilized for the desired HCN level of removal (and in preferred embodiments also in conjunction with the simultaneous removal of other pollutants such as that described above for reactor 38A). Further in FIGS. 3A and 3B there is referenced "SCRart" and "DFC" as a means to reference the different catalytic articles involved (as well as in the illustrated different shading pattern); although, as mentioned above, a suitable representative for SCRart includes "DNX"; and a suitable representative for DFC includes "DNO" (the same being true for FIGS. 3C to 3M).

Figure 3C:
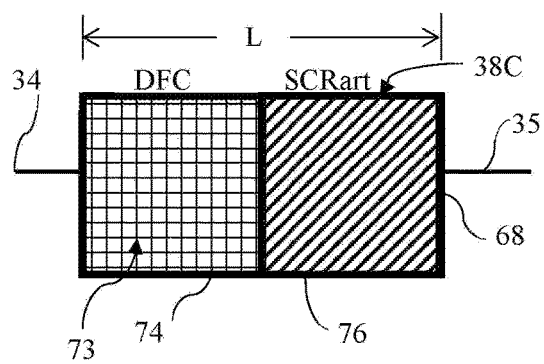

FIG. 3C shows reactor 38C featuring a similar arrangement and usage within catalytic system 24 as reactors 38A and 38B above, but for a modified catalyst device 73 configuration. This includes an upstream catalytic article 74 (shown as a DFC type, again taking on any of the DFC forms described above and below, with the noted DNO as a potential choice in providing means for HCN removal or HCN "plus" pollutant(s) removal (e.g., HCN and NOx as in NO and/or NO2). FIG. 3C illustrates DFC 74 taking up only a portion of the flow direction length of housing 68, which relative length can be adjusted to suit the anticipated environmental characteristics (as in the FCC processing characteristics such as temperature and exhaust gas constitution driven mainly by the FCC processing characteristics which in turn are often driven to a large extent by the feed being processed (e.g., cracked) in the FCC together with the goal of HCN reduction factored therein). FIG. 3C illustrates about 50% of catalyst device length L being taken up by the upstream catalytic article 74 (which is also represented by 50% of the common length L for housing 68 in this embodiment).

The remaining portion of L is shown occupied by catalytic article 76, which in this embodiment is in the form of SCRart (e.g., a DNX) and thus with 50% occupied by the DFC 74, catalytic article 76 is shown occupying the remaining 50% of L. Again the relative percentage of the upstream and downstream catalytic articles 74 and 76 can be modified from the illustrated 50/50 split to better suit the processing conditions and characteristics of the FCC flue gases passing there through and/or there over and to meet the desired HCN reduction goals.

Also, each catalytic article making up catalyst device 73 (i.e., 74 and 76 in this embodiment and also true relative to the above and below described catalytic article embodiments) can take on any one of the above described corresponding (DFC, SCRart) forms with all combinations contemplated where the environment is suitable (e.g., the use of different catalyst support substrate types (e.g., one a honeycomb catalyst support substrate, the other corrugated sheeting) or usage of different carrier materials such as one with molecular sieves (e.g., zeolite or other microporous support particles) and the other with metal oxide particles (as in in lanthanum doped alumina, etc.); or use of different catalyst compositions directed at achieving the catalytic purpose of the respective DFC or SCRart. Again, these various options for the catalyst device 73 can also represent the make-up of any of the other catalyst devices within the figure set 3A to 3L (and 38M in FIG. 4), although the aforementioned DNX and/or DNO with associated characteristics such as a corrugated catalyst support substrate and catalyst compositions are well suited for usage in an environment such as the described FCC unit flue gas environment and in meeting desired HCN reduction goals.

Figure 3D:
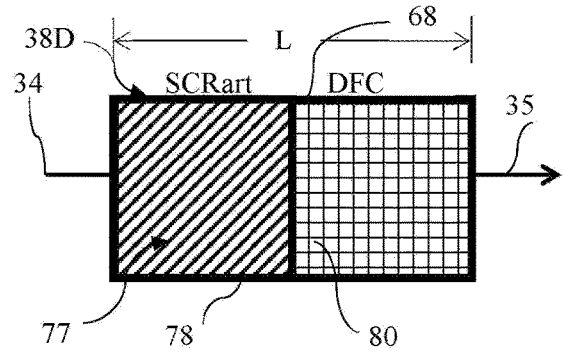

The catalyst reactor 38D in FIG. 3D is in all ways similar to that of FIG. 3C, but for a reversal of the upstream/downstream relationship in its catalyst device 77. That is, the DFC and SCRart catalytic articles are switched in position relative to the upstream-to-downstream flow stream passage such that, in catalyst device 77, the upstream 50% of housing 68 of the catalyst reactor 38D is occupied by SCRart 78, while the downstream 50% is occupied by DFC 80 (each being any one of the above described (respective) catalytic article forms, with all combinations contemplated where the environment is suitable (as per the option discussion in the paragraph immediately above). Again, a representative sequence in FIG. 3D features DNX and DNO in flow sequence.

Figure 3E:
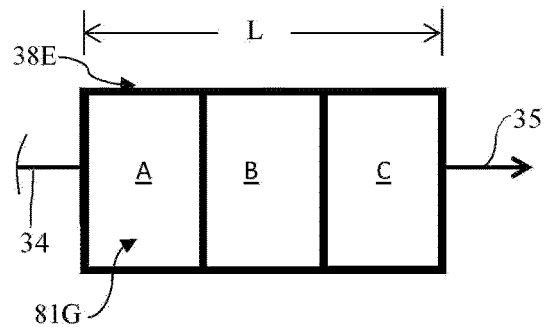

FIG. 3E shows catalyst reactor 38E having catalyst device 81G comprising a three sequence of catalytic articles A, B and C; with A being either an SCRart or a DFC; with B being either an SCRart or a DFC; and C being either an SCRart or a DFC. Thus, FIG. 3E shows catalyst reactor 38E as having any of the potential variations relative to the options noted between an SCRart and a DFC relative to each of locations A, B and C illustrated. Some examples of such potential combinations are provided below relative to FIGS. 3F(a) to 3F(c), with other combinations being possible under the invention based on the generic A, B and C representation in FIG. 3E, although not specifically shown (as such combination potential would be understood based on the above discussion and depictions, as in the FIG. 3E generic representation and examples thereof found in FIGS. 3F(a) to 3F(c) below).

Figure 3F:
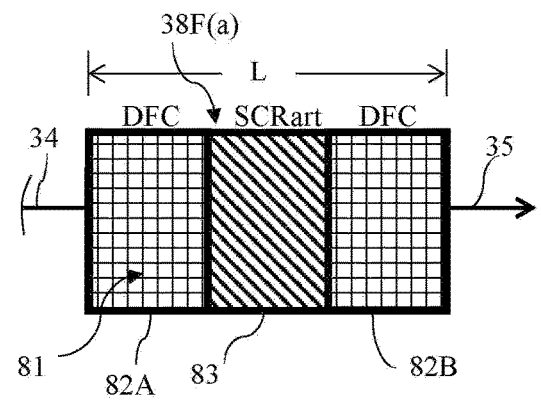
Figure 3F:
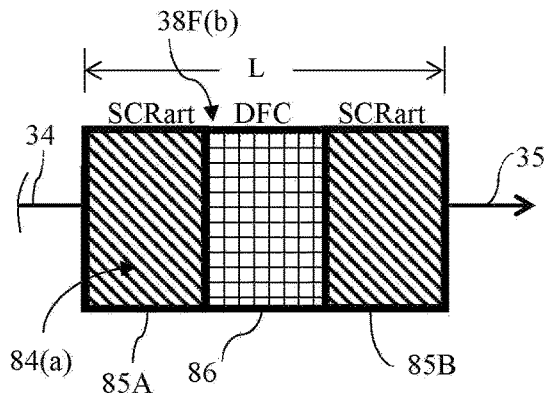
Figure 3F:
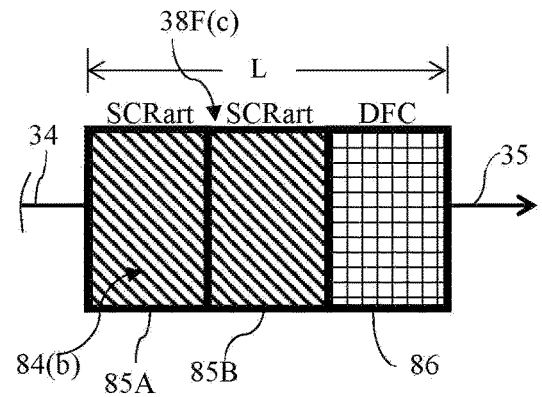

FIG. 3F(a) shows an alternate embodiment wherein catalyst reactor 38F(a) houses catalyst device 81, which is comprised of three catalytic articles that are shown in the upstream-to-downstream sequence of: DFC 82A→SCRart 83→DFC 82B. Again each of the two DFCs and the one SCRart can be zoned regions on a single monolithic catalyst support substrate or can be independent catalyst support substrate components as in those featuring catalytic articles that are in series sequence with abutting casings or directly abutting catalyst support substrates (or, as explained below, multiple components in separate housings or spaced apart with interior bridging conduit(s) provided for outlet-to-inlet flow from one to the next in sequence).

Also, each of the two DFC 82A and 82B can have the same structure and composition or can be different. For example, one DFC can have a higher relative loading and/or different relative length in the upstream-downstream direction. For example, one of DFC 82A and 82B can have a "high-load" active oxidation catalyst (e.g., PGM) composition (as per the weight range discussion above) while the other has a lower load (as in a "low-load" composition as also per the weight range discussion above). For example, a high load upstream DFC 82A and a lower load downstream DFC 82B or vice versa. The nature of the flue gas pollutants (level and/or composition) can dictate the relative load levels—as in having the second, downstream DFC at a higher PGM load when the nature of the flue gas and nature of the two upstream catalytic articles (82A and 83) suggests having a higher downstream PGM (e.g., palladium) load, as when there is anticipated NH3 slippage past the two noted upstream catalytic articles and thus providing an ammonia oxidation or "AMOX function). Further, whereas each of the catalytic articles are shown as occupying about a third of the overall length, any one of the three can have a lesser or longer relative length as in a range of 10 to 60% (e.g., 60/30/10 or 10/45/45 as but a few examples relative to the noted split range) occupied for each split such that the total is 100% and more preferably each split ranging from 20 to 40 as just a few examples of the potential relative length variation amongst the three catalytic articles in this embodiment.

FIG. 3F(b) shows another three sequenced catalyst reactor embodiment similar to that described above for FIG. 3F(a), but with a different mix of sequenced catalytic articles in catalyst device 84(a). That is, within housing 68 there is positioned catalyst device 84(a) having, in flue gas flow sequence, catalytic articles 85A→86→85B with 85A and 85B each being an SCRart type catalytic article (e.g., each a DNX catalytic article) and with catalytic article 86 being a DFC as in a DNO catalyst. In similar fashion to catalyst device 81, the configuration and composition of the two catalytic articles 85A and 85B can be the same or one can vary relative to the other (as in type of SCR composition such as one being a DNX and the other being based on a different SCR composition as in a situation where each has a different SCR catalyst composition; and/or different carrier material usage (e.g., one with a molecular sieve carrier material (e.g., zeolite or other microporous support particles) and the other with a metal oxide such as alumina); and/or different relative washcoat loading levels if a washcoat application is used, etc.). Also, the potential length ranges for the three catalytic articles described in catalyst device 81 also preferably apply to the present three split catalyst device 84(a). Also the intermediate DFC can have either one of the high or low load PGM load ranges, depending on the environment of intended usage such as the FCC unit's anticipated flue gas output composition under the goal of HCN reduction.

FIG. 3F(c) shows another three sequenced catalyst reactor embodiment with catalyst device 84(b) having two SCRart and one DFC, as in FIG. 3F(b), but with the sequence being 85A→85B→86 with 85A and 85B each being of the SCRart type (e.g., each a DNX catalytic article) and with the most downstream catalytic article 86 being a DFC (e.g., a DNO catalytic article). The aforementioned different options relative to the different catalyst articles (as in the noted different SCRart type compositions) is equally applicable for this FIG. 3F(c) example of the present invention.

As noted above, various other A, B, C fill in options relative to the choices of DFC or SCRart for receipt therein are featured under the present invention, inclusive of PGM load variations in the DFC either relative to a single DFC present or relative to combinations of DFC's if two or three are present relative to A, B and C (e.g., an embodiment of each of A, B and C each being a DFC or each being a SCRart that are all the same or with each or some in the group having a different composition and/or structure).

Figure 3G:
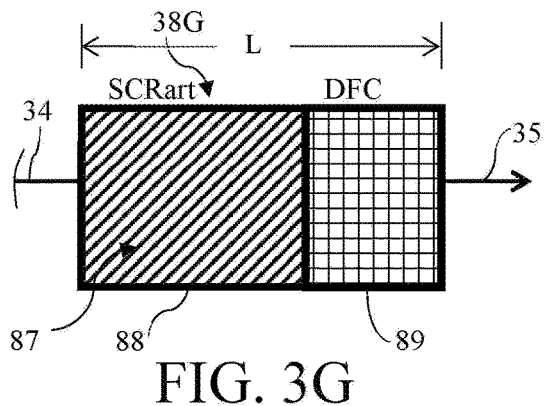

FIG. 3G shows a two sequence catalyst reactor 38G having catalyst device 87 which is similar in many respects to that described above for FIG. 3D, but with a different percentage length in the respective catalytic articles 88 and 89. As shown, catalyst device 87 has the upstream catalytic article 88 of a greater % length of L than the downstream catalytic article 89, and with catalytic article 88 being of the SCRart (e.g., DNX) type and catalytic article 89 of the DFC (e.g., DNO) type. Catalytic articles 88 and 89 are again shown without any intermediate gapping as in respective abutting casings (or abutting catalyst support substrate contact) or different zones on a common catalyst support substrate within a common housing or conduit passageway. The greater percentage length of catalytic article 88 is illustrated in FIG. 3G as being about ⅔ of L, with the remaining third occupied by DFC catalytic article 89. Alternate examples having such a longer/shorter relationship include upstream catalytic article 88 having a % of L preferably at least 55% and up to 90%, with the remainder (10% to 45%) represented by the downstream catalytic article 89.

Figure 3H:
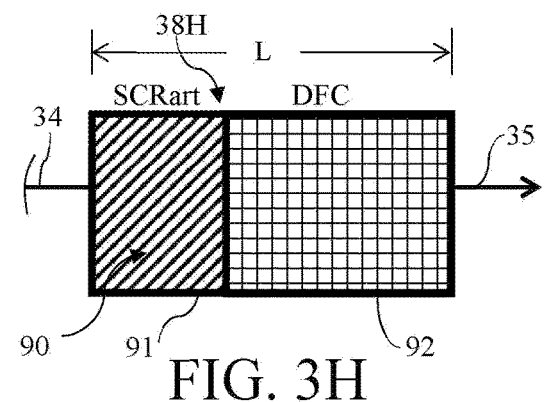

FIG. 3H shows another two sequence catalyst reactor 38H having catalyst device 90 which is similar in many respects to that described above for FIG. 3G but with a different percentage length in the respective catalytic articles 91 and 92. As shown, catalyst device 90 has upstream catalytic article 91 of a lesser % length of L than the downstream catalytic article 92, and with catalytic article 91 being of the SCRart (e.g., DNX) type and catalytic article 92 of the DFC (e.g., DNO) type. Again shown without any intermediate gapping as in abutting casings or directly contacting individual catalyst support substrates. The lesser percentage length of catalytic article 91 is illustrated in FIG. 3H as being about one third of L, with the remaining two thirds occupied by downstream catalytic article 92. Examples include having downstream catalytic article 92 with a % of L preferably at least 55% and up to 90%, with the remainder (10% to 45%) represented by the upstream catalytic article 91.

Figure 3I:
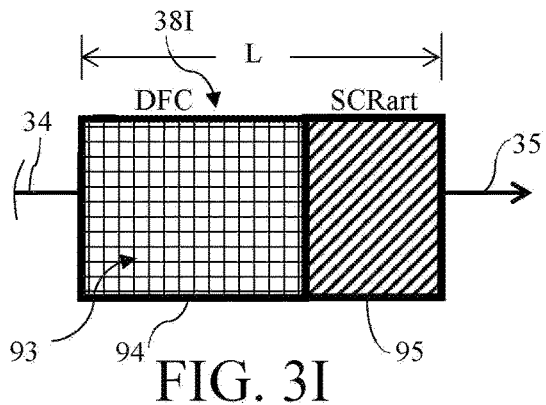

FIG. 3I shows another two sequence catalyst reactor 38I having catalyst device 93 which is similar in many respects to that described above for FIG. 3C but with a different percentage length in the respective catalytic articles 94 and 95. As shown, catalyst device 93 has the upstream catalyst article 94 of a greater % length of L than the downstream catalyst article 95, and with the shown downstream catalytic article 95 being of the SCRart (e.g., DNX) type and the shown upstream catalytic article 94 of the DFC (e.g., DNO) type. Again shown without any intermediate gapping as in abutting casings or directly contacting individual catalyst support substrates. The greater percentage length of catalytic article 94 is illustrated in FIG. 3I as being about ⅔ of L, with the remaining third occupied by catalytic article 95. Alternate examples having such a longer/shorter relationship include upstream catalytic article 94 having a % of L preferably at least 55% and up to 90%, with the remainder (10% to 45%) represented by the downstream catalytic article 95.

Figure 3J:
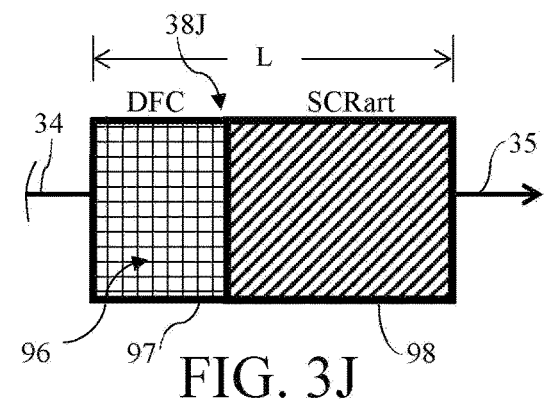

FIG. 3J shows another two sequence catalyst reactor 38J having catalyst device 96 which is similar in many respects to that described above for FIG. 3C, but with a different percentage length in the respective catalytic articles 97 and 98. As shown, catalyst device 96 has the upstream catalytic article 97 of a lesser % length of L than the downstream catalytic article 98, and with catalytic article 97 being of the DFC (e.g., DNO) type and catalytic article 98 of the SCRart (e.g., DNX) type. Again shown without any intermediate gapping as in abutting casings or directly contacting individual catalyst support substrates. The greater percentage length of downstream catalytic article 98 is illustrated in FIG. 3J as being about ⅔ of L, with the remaining third occupied by upstream catalytic article 97. Additional examples include downstream catalytic article 98 having a % of L preferably at least 55% and up to 90%, with the remainder (10% to 45%) represented by the upstream catalytic article 97.

Figure 3K:
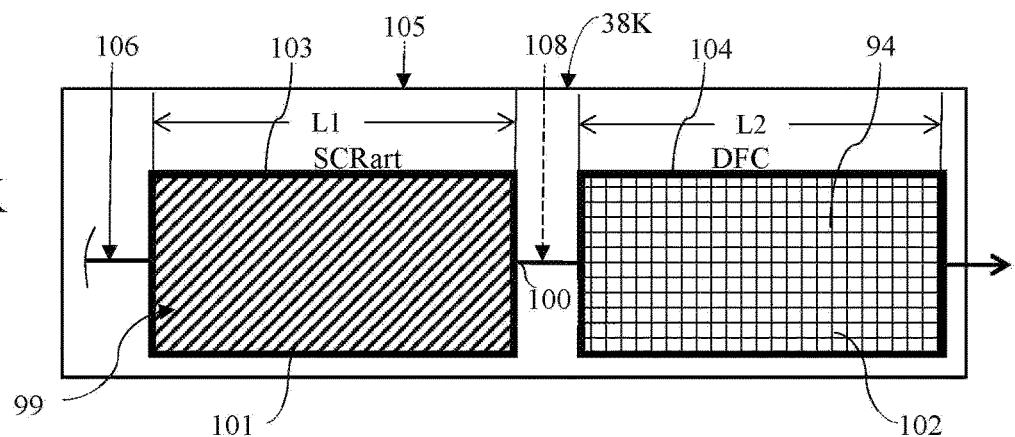

FIG. 3K shows another two sequence catalyst reactor 38K having catalyst device 99 which is similar in many respects to that described above for FIG. 3D, but with catalyst device 99 being differently formed in that there is spacing or bridging conduit 100 between the upstream catalytic article 101 and the downstream catalytic article 102, with the flow spacing conduit 100 feeding preliminarily treated flue gas exiting catalytic article 101 to downstream catalytic article 102 for further catalytic treatment. In this catalyst reactor 38K the upstream catalytic article 101 is of the SCRart (e.g., DNX) type and the downstream catalytic article 102 is of the DFC (e.g., DNO) type. Also, there is shown independent housings 103 and 104 that communicate via the in-between spacing or bridging conduit 100, although depending upon the spacing length and nature of the flue gas feeds, there can be a common housing 105 (in which case reference numbers 103 and 104 can be representative of the protective casings for each of catalytic articles 101 and 102 described earlier). Also, with the additional bridging space between catalyst articles 101 and 102, an added sensor is provided under an embodiment of the present invention (as in one that is part of the aforementioned sensor device 66 that provides for a gas characteristic sensing, as in a level of HCN in the gas flow). Thus sensor device 66 is preferably positioned downstream of catalytic article 102 for HCN monitoring and preferably with control unit communication, but embodiments also include sensor device 66 as having additional means for also sensing flue gas travelling between catalytic articles 101 and 102 which also preferably communicates with control unit 124 (FIG. 1) for suitable adjustments, as in the water vapor supply to the flue gas.

Relative to FIG. 3K, there is also illustrated feed lines 106 and 108, with feed line 108 being shown as dashed as an example of being optional. That is, line 106 or each of lines 106 and 108 can be an example of feed line 60 shown in FIG. 1 as used, for example, to feed NH3 or an NH3 precursor (and of the varies examples described above as in anhydrous ammonia or aqueous ammonia or an aqueous urea solution) to downstream reactor 102 (e.g., a DNO with NH3-SCR functioning). Alternatively, the feed types can be different, as in the upstream 106 feed line feeding NH3 or an NH3 precursor (with or without added water, or further diluted or not diluted from its present state with water) and the downstream feed line 108 blocked off or providing H2O with or without ammonia (or ammonia precursor) for added hydrolysis breakdown of HCN; or each of lines 106 and 108 providing a mix of H2O and ammonia (or ammonia precursor—diluted or not diluted), inclusive of the same or different relative reductant feed levels.

Figure 3L:
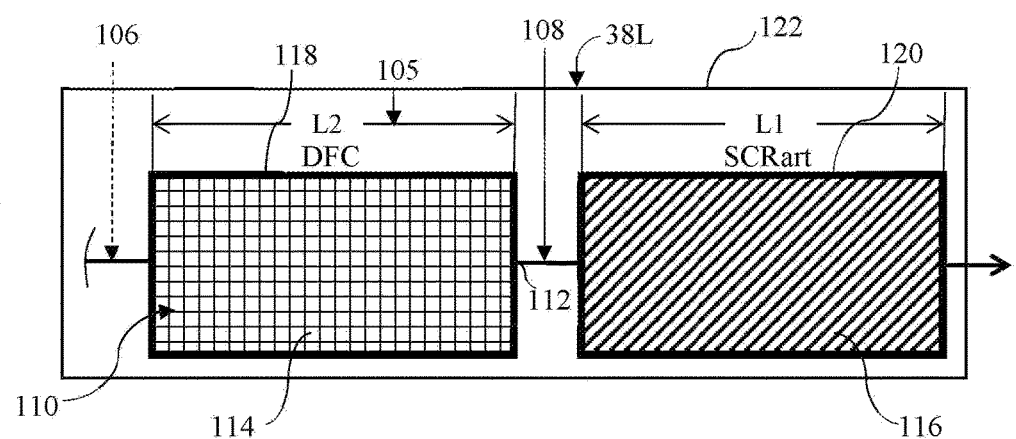

FIG. 3L shows catalyst reactor 38L, which is similar to that of FIG. 3K, but with the catalytic articles SCRart and DFC in reverse sequence relative to the exhaust gas flow. Catalyst reactor 38L in FIG. 3L thus includes catalyst device 110 which is similar in many respects to that described above for FIG. 3C, but with catalyst device 110 being differently formed in that there is spacing or bridging conduit 112 between the upstream catalytic article 114 and the downstream catalytic article 116, with the flow spacing conduit 112 feeding preliminarily treated flue gas exiting catalytic article 114 to downstream catalytic article 116 for further catalytic treatment. In this catalyst reactor 38L, the downstream catalytic article 116 is of the SCRart (e.g., DNX) type and the upstream catalytic article 114 is of the DFC (e.g., DNO) type. Also, there is shown independent housings 118 and 120 that communicate via the in-between spacing or bridging conduit 112, although depending upon the spacing length and nature of the flue gas feeds, there can be a common housing 122 (in which case reference numbers 118 and 120 can be representative of the protective casings for each of catalytic articles 114 and 116). Also, with the added bridge spacing provided via conduit 112, like that described in FIG. 3K, an additional flow line (e.g., the two flow lines 106 and 108 depicted in their respective upstream locations relative to catalytic articles 114 and 116) as well as the above described added sensor means (not labeled in FIG. 3L, but the discussion above relative to sensor means 66 for the FIG. 3K embodiment can be applicable; as can be the different potential content variations in feed lines 106 and 108 also described above for catalyst reactor 38K).

As further seen in FIGS. 3K and 3L, the respective housing (or casing) lengths are shown of lengths L1 and L2, respectively, and are each preferably less than or equal to length L described for the other embodiments, as in (L1+L2≤2L); as in (L1+L2≤1.5L (as in L1+L2=L)).

Also, the above referenced different catalyst devices are shown as forming a component of the catalyst reactor (e.g., catalyst reactor 38A) and thus also a component of the catalytic system (e.g., catalytic system 24A). Further, as seen from the various embodiments described above, the reference to "catalytic article", in the context of the various catalyst reactor types described, is inclusive of the different catalytic article(s) configurations (e.g., catalytic article 74 and 76) featuring DFC(s) and SCRart(s) such as those provided on a common, singular monolithic catalyst support substrate; or provided as independent, horizontally stacked and in contact articles (e.g., individual within or free of surrounding casings in abutment in flow sequence preferably within a common housing or independent housings in contact); or independent flow stream separated articles (individual articles spaced apart from each other was with intermediate flue gas connectors as in an conduit interconnector).

With reference again to FIG. 2A there is provided additional discussion as to catalytic system 24, inclusive of the providing of the desired feed content in feed line 60. FIG. 2A shows control unit 124 which facilitates controlling the various components in catalytic system 24 to achieve a desired feed content and timing of feed source(s) to feed line 60 (which leads to the injection device such as one or more ammonia injector grids like those discussed above). Control unit 124 is shown as being in sensor and/or activation communication with the above described components of catalytic system 24. That is, control unit 124 is shown in this embodiment as being in communication (with the dash communication lines shown being representative of wired and/or wireless communication) with reductant (e.g., ammonia or ammonia precursor) feed source 46, flow rate controller 50, valve unit 52, second (e.g., water) source 54, flow rate controller 58, as well as each of the illustrated sensor devices 62, 64 and 66.

Control unit 124 can be a part of a conventional general control unit used for overall FCC unit operation, or a standalone "feed-condition-control" unit used to provide the desired feed content to feed line 60 (or multiple feed lines as discussed above such as relative to feed lines 106 and 108) and to monitor the flue gas characteristics using sensor(s) such as depicted sensor devices 62, 64 and 66.

Control unit 124 can include non-transitory code or instructions stored in a machine-readable medium (e.g., memory) and used by a processor to implement the techniques disclosed herein. In certain embodiments, the control unit 124 may utilize the memory to store instructions (e.g., code) and the processor (e.g., multiple microprocessors, one or more "general-purpose" microprocessors, one or more special-purpose microprocessors, and/or some other processor configuration) to execute the instructions. The memory may store various tables and/or models (e.g., software models representing and/or simulating various aspects of desired exhaust gas treatment conditions, as well as historical data based on past performance, as with similar variables as in catalyst type (e.g., the characteristics of the catalyst reactor 38 placed in flue gas flow in whether a DFC and/or SCRart and/or the respective length(s) thereof as a few examples) and loading relative to known exhaust flow characteristics such as with an FCC unit (e.g., the PGM value as in a high or low PGM load characteristic). The control unit may utilize one or more types of models (e.g., software-based models executable by a processor). For example, the models may include statistical models, such as regression analysis models. Regression analysis may be used to find functions capable of modeling future trends within a certain error range. Association techniques may be used to find relationship between variables (e.g., extrapolation of CO sensed amounts as indicative of HCN amounts). Also, the data utilized with the models may include historical data, empirical data, knowledge-based data, and so forth. Control unit 124 can also be hard wired to any sensing means utilized or configured to operate solely or partially in wireless fashion with the sensing means (e.g., transmitting sensors and corresponding receiving units that provide data to the processing system (e.g., processor circuitry for carrying out the above described functioning)). The control unit can rely on feed-forward and/or feed-back input such as from any one (or any combination) of sensor devices 62, 64 and 66.

Thus, with reference again to FIG. 2A there can be adjusted the relative ratio of respective feed sources such as the percentage of reductant (e.g., ammonia sources such as those outlined above) sourced from feed source 46 as compared to the amount (if any) of water (preferably in heated vapor form) sourced from second source 54. The sensing means, such as an HCN slippage sensor 66, can be used to facilitate a desired ratio. For instance as noted above there is descried in the prior art the belief that HCN can be broken down via oxidation (chemical formula (5) above: $4 HCN + 5O_2 \rightarrow 4CO_2 + 2N_2 + 2 H_2O$); and/or hydrolysis (chemical formula 6 above: Hydrolysis: $HCN + H_2O \rightarrow NH_3 + CO$); and/or a denitrification process (chemical formula 7 above—generally represented as: $HCN + NO \rightarrow N_2 (gas) + CO + CO_2 + H_2O$).

Thus, with, for example, usage of sensor(s) monitoring the flue gas constitution at one or more suitable locations; as in a locating sensor means 66 downstream of the downstream most catalytic article, or alternatively there and also at an intermediate location between two SCR components and/or utilizing additional sensing means for monitoring at both inlet as well as the on-going flue gas outlet characteristics (and also preferably both upstream and downstream of the injection point 61 injecting into inlet line 34 as seen by sensing means 62 and 64 positioning), there can be fed a suitable ratio of first and second sources (e.g., NH3 and H2O) to achieve a reduction in HCN, preferably while also avoiding undesirable levels of other pollutants travelling in the flue gas (particularly NOx relative to the SCR nature of the one or more catalytic devices). For instance, additional water vapor can be added upstream to enhance the hydrolysis breakdown via formula (6) particularly where the O2 and/or NO level upstream is deemed lower as to lessen the perceived formula (5) and (7) HCN breakdown capability and/or the flue gas temperature favors one catalytic reaction over another.

Further, the SCR reactor can be designed for the anticipated type of flue gas to be received from the combustion unit, such as the FCC unit's anticipated flue gas constitution during typical operation. For instance, if reliance is placed on a relatively heavy dosage of hydrolysis breakdown, there can be anticipated an increase in CO output. This increase in CO output (if there is lacking a downstream dedicated CO removal unit) can be addressed by way of a downstream positioned DFC with an upstream SCRart (or both upstream DFC and SCRart). Further the level of CO output can also be monitored by sensor device 66; and in conjunction with, for example, historical stored data in the control unit 124 memory, can be used to extrapolate the level of HCN slippage, if any. Alternative or in addition thereto sensor 66 can include a direct HCN monitoring means or both a direct HCN level sensor and CO levels (noting that the term "sensor" as in sensor device 66 includes sensor systems that are either dedicated to one parameter testing or include multiple parameter testing as in the noted CO and HCN monitoring as well as different physical characteristic as in chemical, pressure and temperature monitoring such as via the noted sensor device 66 illustrated, with the latter also including potentially a sample capture device for use in a different sensing means at FCC unit location or off FCC unit location sample testing (another example of direct testing of HCN slippage but at a different sampling location ultimately)).

Further, as noted above, there is considered in the art the potential for HCN generation in NH3-SCR systems as a byproduct of such a reaction depending upon temperature and other exhaust flow and system characteristics. Thus the sensing and control means of catalytic system 24 can factor in the potential for NH3-SCR generation of HCN during the SCR processing as to entail, for example, a lessening of NH3 feed via source 46, as when the conditions sensed suggest (e.g., based on control unit analysis as via historical data and/or current or real time sensed conditions) that undesirable HCN output to outlet line 35 could be anticipated if appropriate steps are not taken (e.g., an anticipated or sensed high level of formaldehyde development within a region of the SCR component that could lead to undesirable HCN formation). The two different sources 46 and 54 as well as the associated flow controllers 50 and 58 and the valve unit 52 (with potential settings of one or the other flow possible or both flows possible) provide for any desired manipulation of the relative ratio of sourced feed. Alternatively, each of sources 46 and 54 can have their own dedicated flow line without the need for valve unit 52; as in a catalytic system 24 with means for supplying the aforementioned (e.g., ammonia and H2O respectively) via feed lines 106 and 108 shown in FIG. 3K (or independent lines each being upstream of a first in line SCR component); or (although not shown) the H2O feed can be supplied to a container for the first supply source to increase the overall H2O level upon which a more diluted first feed source can be fed via a feed line from the first feed source to an injection location such as location 61 in FIG. 2A (e.g., the first and second sources sharing a common container before feed to line 60, with the option of an embodiment wherein the level of H2O in the two sources container is adjusted, as via an H2O in feed to the container; or, alternatively, reliance can be placed on a given H2O content for the sources in the container, as in aqueous urea or aqueous ammonia, with an optional potential feed flow adjustment thereof, as another way to adjust the hydrolysis level in the flue gas entering a catalyst reactor).

Figure 2B:
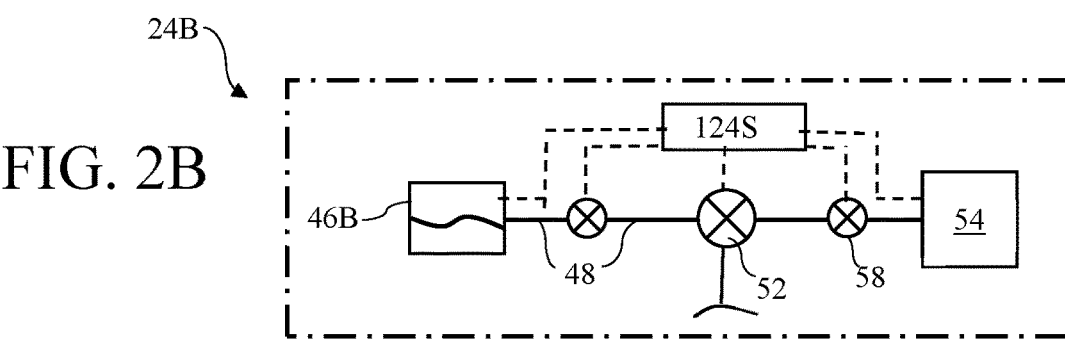
FIG. 2B shows a view similar to FIG. 2A but of an alternate catalytic system embodiment.

FIG. 2B shows the dot-dash region of FIG. 2A in the context of a specific dual or combination source type for the first and second sources (referenced generally as source 46B), which, in this case, is, for instance, aqueous urea or aqueous ammonia; and thus has a percentage of H2O inherently forming part of the dual source 46B; and which is injected into the flue gas flow stream via injection location 61 via a suitable aqueous urea or aqueous ammonia injection means as in any one, or any combination, of the ammonia injection means (as in an ammonia injection grid) described herein.

Hence, upon supply of the aqueous urea or aqueous ammonia (or other water based SCR reductant) there is implemented a hydrolysis source in the supply of aqueous urea or ammonia, which the control unit factors in when determining the best ratio suited for HCN and preferably other pollutants removal like described above. Additionally, there can be retained a second H2O source (third source in general) 54 for situations where the typical H2O percentage in the aqueous urea is not deemed sufficient for the desired level of hydrolysis in reactor 38. For instance, with standard aqueous urea having urea % levels as in 32.5 percent, the relative H2O/NH3 ratio can be increased via added third source 54 feed (shown as feeding valving unit 52, although alternate embodiments include feeding to a tank representing feed source 46 for dilution of its contents, or another line injection H2O to the reactor itself or upstream in inlet line 34).

As noted, dual feed source 46B is preferably one inherently H2O containing. Thus, other than the aqueous urea as a source, there can be featured aqueous ammonium formate solution or aqueous ammonia which each can be manipulated by changing the solvent (water) level in each to provide a similar function as described above for aqueous urea (and H2O percentage adjustments thereto). The hydrolysis level can also be manipulated by adjusting the feed from the dual source 46B alone where the associated ammonia or ammonia precursor variation is acceptable per the control unit, for example. In an alternate embodiment wherein the mixing time is adequate any of the above mentioned sources 46B can be provided in dry form with the source 54 used to provide the desired solvent level at the time of injection (in which case source 54 represents a second source rather than a third source). Also, in FIG. 2B, control unit 124 is only partially shown (or a sub-control unit is featured) and referenced as control unit 124S.

Figure 2C:
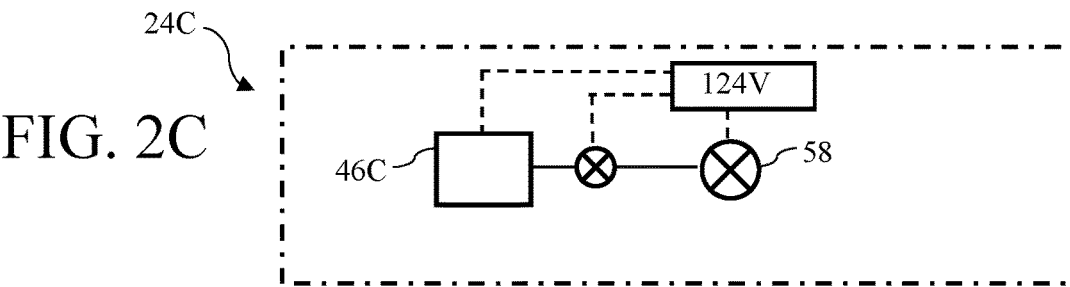
FIG. 2C shows another catalytic system embodiment.

FIG. 2C shows the dot-dash region of FIG. 2A as well; and features a system that is free of the added source 54 with reliance instead on dual source 46B alone. This can include the aforementioned solvents such as those involving H2O and which have a predesigned H2O content that can be supplied to achieve the desired flue stream additions. Rather than adjustments in solvent levels there can be adjusted the feed rate to one that is lower or higher depending on the control unit determinations (with a sub control or partial control unit shown in FIG. 2C). The same rate adjustments can also be implemented on one side or the other relative to source feeds 46 and 54 in the above described embodiments.

The catalytic system 24 (and embodiments thereof as in catalytic system 24A, 24B and 24C) of the present invention is inclusive of systems that operate alone relative to the removal of the noted pollutant HCN and preferably also other pollutants as in any one or a combination of the other VOCs, NOx and CO pollutants in the flue output from the main distillation column of an FCC unit. That is, the catalytic systems described herein can be used as the sole means for the removal of the aforementioned pollutant(s) exiting the main distillation column of the FCC unit (the sole catalytic system directed at the above noted pollutants of at least HCN; or NOx and HCN; or each of HCN, NOx and CO) that is positioned between the main distillation output and atmosphere). This can be done by passing the flue gas into contact with one of the noted catalyst reactors of the present invention (with a DFC featured if oxidation of CO and VOCs is involved and not carried out by a separate means).

Figure 4:
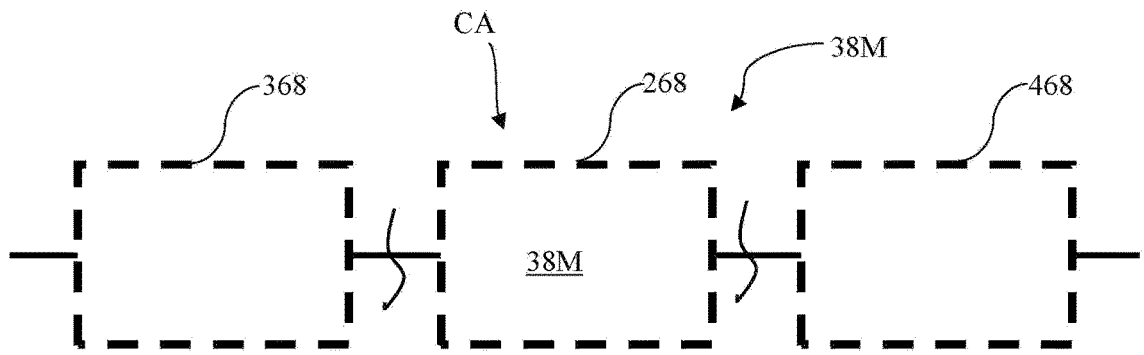
FIG. 4 shows an alternate embodiment of a catalytic system under the present invention.

FIG. 4 illustrates some alternate embodiments of the present invention, having, in addition to any one of the catalyst reactors 38 described above, one or more additional, alternate function focus related catalyst reactors, either upstream and/or downstream of the above noted catalyst reactor 38 of the present invention, with emphasis in FIG. 4 on catalyst devices in sequence downstream of the main distillation column (as per the discussion above, a variety of pre-distillation pollution removers can be involved in FCC units, as in the noted SOx scrubbers and cyclone catalyst systems associated with some FCC units at a more upstream location in the overall FCC unit and thus upstream of the main distillation column in many instances). In this regard, FIG. 4 illustrates an example of a multi (different function intention) catalyst grouping that includes one or more catalyst devices in that grouping beyond the HCN reduction catalyst reactor featured in the present invention). Thus, in FIG. 4 there can be seen catalyst assembly CA, which includes catalyst reactor 38M (which is intended as a generic representation of any one of the aforementioned reactors 38 having any one of the catalyst device arrangements described and/or illustrated above). The added one or more additional catalyst devices are represented by one or the other (or both) of catalyst devices 368 and 468 in FIG. 4, which are preferably different catalytically focused catalyst reactors than reactor 38M (e.g., devices 368 and 468 are not focused on HCN reduction control). Thus either or both of catalyst reactors 368 and 468 can be placed in the flue gas line in combination with reactor 38M. For example, the addition of an added active oxidation catalyst 468 downstream of reactor 38M and having a non-SCR function is shown in position as where there is a need of additional processing following the desired HCN removal level (as in an added oxidation catalyst to address NH3 slippage away from reactor 38M). In addition to reactor 468, or alternatively thereto, there can be featured an upstream reactor 368 such as one that is designed to treat the flue gas as to be in a better chemical content shape at the time of entering the reactor 38M as in a catalyst reactor to adjust the NO/NOx levels.

Thus, FIG. 4 illustrates in dashed lines (to represent the situational optional nature thereof) the upstream added catalyst reactor 368 and/or downstream reactor 468, which can take on a variety of forms as described above and inclusive as well as other alternatives as in additional SCR reactors; particle filters with catalyst loadings; catalysts directed at SOx removal, solitary oxidation catalysts; adsorption catalysts (nitrogen oxide storage and release catalysts); and other catalyst means providing a desired function in conjunction with catalyst reactor 38M. Also, if applicable (as at least some of the alternate functioning catalysts may not need added material such as a reductant to operate), common feed sourcing can be utilized for any added catalyst means for use with catalyst reactor 38M such as that described in FIGS. 2A to 2C; or reliance can be placed on an independent feed source also preferably provided with sensors and an associated control unit feature; or none at all if a reductant or the like upstream feed is not involved, and only flue gas contact is involved.

The process of the present invention includes the reduction of HCN in flue gas output from an FCC unit which includes passing that off-gas through any one of the above referenced catalytic systems, with preferably associated sensor monitoring and controlling, and with the catalytic system being configured preferably not only for HCN reduction but also simultaneous removal of additional pollutants, as in any one or any grouping of NOx, CO and other hydrocarbon pollutants (with the simultaneous removal of HCN and NOx being illustrative). When sensing and/or controlling means are featured, the catalytic system can be operated to adjust, for example, the feed amounts of the SCR reductant, as in the aforementioned ammonia sources through flow rate adjustments as in a flow controller and/or valving. In addition, or alternatively, there can be adjusted, when available, a second feed source such as a hydrolysis promoting source feed (inclusive of common container ammonia or ammonia precursor and water) or source dilution means such as the aforementioned water source 54 (again via flow rate adjustments as through a flow controller and/or valving). This is inclusive of dilution of an aqueous first feed source, with one technique for supplying a more diluted version of a reductant as usually supplied on the market being by adding dilution water to a urea or aqueous ammonia source container tank.

Exemplary embodiments of systems, methods, and apparatus are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

In the present disclosure it is also intended that value points are inclusive of all intermediate points (and all sub-ranges within a larger specified range) at a common index unit value—as in a range of 1 to 10 is inclusive of 2, 3, 4 . . . to 9 as well and available sub-ranges therein as in 3 to 5), or as in a range of 1.0 to 10.0 is inclusive of all intermediate points 1.1, 1.2, 1.3 . . . 9.9) (and all sub-ranges within a larger specified range as in 1.3 to 1.7).

What is claimed is:

1. An assembly, comprising:
a fluid catalytic cracking (FCC) unit generating a flue gas with HCN and NOx;
a catalytic system that comprises a catalyst device placed in line with the flue gas to remove HCN and NOx in the flue gas, the catalyst device having one or more catalytic articles, with one catalytic article of the one or more catalytic articles being an SCR catalytic article (SCRart) that is free of platinum group metal material (PGM) or an SCR catalyst with PGM as to provide a dual function SCR catalyst (DFC);
a first source which includes ammonia or an ammonia precursor;
a second source that includes H2O; and
an injection device for feeding one or each of the first and second sources to the flue gas upstream of the one catalytic article of the one or more catalytic articles.

2. The assembly of claim 1, wherein the one or more catalytic articles of the catalyst device includes each of a DFC and an SCRart.

3. The assembly of claim 2, wherein the catalyst device includes at least three catalytic articles as to feature at least two DFC in combination with an SCRart or at least two SCRart in combination with a DFC.

4. The assembly of claim 3, wherein the catalyst device comprises two DFC and one SCRart in an upstream to downstream sequence of DFC/SCRart/DFC or SCRart/DFC/DFC or DFC/DFC/SCRart.

5. The assembly of claim 3, wherein the catalyst device comprises two SCRart and one DFC in an upstream to downstream sequence of SCRart/SCRart/DFC or SCRart/DFC/SCRart or DFC/SCRart/SCRart.

6. The assembly of claim 1, wherein the one of the one or more catalytic articles of the catalyst device comprises vanadium.

7. The assembly of claim 1, further comprising means for determining an HCN level either directly or indirectly relative to HCN level passing downstream of the catalyst device.

8. The assembly of claim 7, wherein the means for determining includes a sensor or a sampler for a direct determination of an HCN level passing downstream of the catalyst device.

9. The assembly of claim 7, further comprising a control unit, and the means for determining includes an indirect determination of the HCN level that comprises a CO sensor which is in communication with the control unit for an extrapolation determination by the control unit of the HCN level amount.

10. The assembly of claim 1, further comprising a container, and wherein the first and second sources are commonly stored in the container; and a first feed line extending from the container to the injection device for injection of each of the first and second sources together into the flue gas travelling to the injection device.

11. The assembly of claim 10, wherein the first and second sources are urea and H2O mixed with urea or aqueous ammonia within the container.

12. The assembly of claim 1, further comprising a control unit and wherein the first and second sources feed to a distribution system comprising a valving system in communication with the first and second sources, and one or more feed lines of the distribution system feed the first and second sources to the injection device for feeding one or both of the first and second sources to the injection device for injection into the flue gas passing toward the catalyst device, and wherein the control unit is in communication with sensing means monitoring one or more characteristics of the flue gas and the distribution system for adjustment of the relative percentage of the first and second sources.

13. The assembly of claim 12, wherein the control unit is configured for adjusting the flow from the second source based on the sensed one or more characteristics of the flue gas as to provide for a variable range of from 0-15 vol % water vapor volume fraction in the flue gas traveling to the catalyst device based on a desired level of hydrolysis determined by the control unit.

14. A method for operating the assembly of claim 1, comprising generating flue gas in the FCC unit and passing that flue gas to the catalyst device for removal of HCN and NOx.

15. A method for operating the assembly of claim 14, further comprising sensing the flue gas as to determine or estimate the level of HCN downstream of the catalyst device.

16. A method of removing HCN from a flue gas flow comprising:
passing the flue gas to a catalytic system that comprises a catalyst device placed in line with the flue gas to remove HCN and NOx in the flue gas, the catalyst device having one or more catalytic articles, with one catalytic article of the one or more catalytic articles being an SCR catalytic article (SCRart) that is free of platinum group metal material (PGM) or an SCR catalytic article with PGM as to provide a dual function SCR catalytic article (DFC); and monitoring or sampling to enable a determination of HCN levels in the flue gas exiting the catalyst system.

17. The method of claim 16, wherein the flue gas is generated by an FCC unit.

18. An assembly, comprising:
a fluid catalytic cracking (FCC) unit generating a flue gas with HCN and NOx;
a control unit;
a catalytic system that comprises a catalyst device placed in line with the flue gas to remove HCN and NOx in the flue gas, wherein the catalyst device includes at least one dual function catalytic article (DFC) comprising a substrate that is a corrugated substrate supporting a catalyst composition that comprises a PGM and oxides of vanadium and titanium; and
a sensor device for monitoring directly or indirectly HCN levels in the flue gas exiting the catalyst device.

19. The assembly of claim 18, further comprising a first source having material of ammonia or an ammonia precursor and a second source comprising H2O and feeding means for feeding one of or both of the first source material and the second source material to the flue gas upstream of the catalyst device and the control unit being configured to adjust the feeding means as to vary the amount of first and second sources fed to the flue gas.

20. The assembly of claim 18, further comprising a second SCR catalytic article (SCRart) in the catalyst device that is free of PGM.

21. The assembly of claim 18, wherein the catalyst device comprises at least three catalytic articles, with a first catalytic article of the at least three catalytic articles being an SCR catalytic article (SCRart) that is free of platinum group metal material (PGM) and a second of the at least three catalytic articles is the DFC, with the at least three catalytic articles featuring at least two DFC in combination with an SCRart or at least two SCRart in combination with a DFC.

22. The assembly of claim 1, wherein the one or more catalytic articles of the catalyst device includes a DFC.

23. The method of claim 16, wherein the one or more catalytic articles of the catalyst device includes a DFC.

24. The method of claim 23, wherein the one or more catalytic articles of the catalyst device includes each of a DFC and an SCRart.

25. The method of claim 16, wherein sampling is carried out, and wherein the sampling comprises drawing a sample of the flue gas exiting the catalyst system.

* * * * *